(12) United States Patent
Sugishita

(10) Patent No.: US 10,059,363 B2
(45) Date of Patent: Aug. 28, 2018

(54) STEERING DEVICE

(71) Applicant: NSK Ltd., Tokyo (JP)

(72) Inventor: Suguru Sugishita, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/551,338

(22) PCT Filed: May 18, 2016

(86) PCT No.: PCT/JP2016/064797
§ 371 (c)(1),
(2) Date: Aug. 16, 2017

(87) PCT Pub. No.: WO2016/186147
PCT Pub. Date: Nov. 24, 2016

(65) Prior Publication Data
US 2018/0022375 A1     Jan. 25, 2018

(30) Foreign Application Priority Data

May 19, 2015  (JP) ................................ 2015-102171
Oct. 15, 2015  (JP) ................................ 2015-203674

(51) Int. Cl.
*B62D 1/184*     (2006.01)
*B62D 1/185*     (2006.01)
*B62D 1/187*     (2006.01)

(52) U.S. Cl.
CPC ............. *B62D 1/184* (2013.01); *B62D 1/185* (2013.01); *B62D 1/187* (2013.01)

(58) Field of Classification Search
CPC ......... B62D 1/184; B62D 1/185; B62D 1/187
See application file for complete search history.

(56) References Cited

U.S. PATENT DOCUMENTS 7,699,344 B2 * 4/2010 Moriyama ............. B62D 1/184
                                                      280/775
8,505,407 B2 * 8/2013 Nomura ................. B62D 1/184
                                                      280/775
(Continued)

FOREIGN PATENT DOCUMENTS

CN     101801761 A    8/2010
EP       2353966 A2   8/2011
(Continued)

OTHER PUBLICATIONS

International Search Report of PCT/JP2016/064797 dated Aug. 9, 2016 [PCT/ISA/210].

(Continued)

*Primary Examiner* — Laura Freedman
(74) *Attorney, Agent, or Firm* — Sughrue Mion, PLLC

(57) ABSTRACT

A pair of clamp parts (38 and 38) are provided on both sides of a front end portion of an outer column (11*a*) in a width direction and enclosed in three directions by slit portions. The clamp parts bend when an interval of inside surfaces of a pair of support plate units constituting an upper bracket is reduced so as to elastically sandwich an outer peripheral surface of an inner column (10*a*). First and second surfaces (49*a* and 49*b*) are provided on both sides of the outer column (11*a*) in the width direction and are spaced apart in a vertical direction such that each of the pair of clamp parts (38 and 38) is arranged therebetween, and such that torque acting on the outer column (11*a*) via the first and second surfaces is transmitted to inner surfaces of the support plate units.

11 Claims, 25 Drawing Sheets

(56) References Cited

U.S. PATENT DOCUMENTS

| | | | | |
|---|---|---|---|---|
| 8,562,020 | B2* | 10/2013 | Arakawa | B62D 1/195 280/777 |
| 8,578,812 | B2* | 11/2013 | Minamigata | B62D 1/184 280/775 |
| 8,943,923 | B2* | 2/2015 | Kakishita | B62D 1/187 280/775 |
| 8,955,883 | B2* | 2/2015 | Nagase | B62D 1/18 280/775 |
| 8,985,629 | B2* | 3/2015 | Hattori | B62D 1/195 280/777 |
| 9,114,828 | B2* | 8/2015 | Fujiwara | B62D 1/185 |
| 9,180,902 | B2* | 11/2015 | Nagasawa | B22D 17/00 |
| 9,254,860 | B2 | 2/2016 | Mihara et al. | |
| 9,283,983 | B2* | 3/2016 | Kii | B62D 1/189 |
| 9,415,795 | B2* | 8/2016 | Hagiwara | B62D 1/184 |
| 9,415,796 | B2* | 8/2016 | Hagiwara | B62D 1/184 |
| 9,550,513 | B2* | 1/2017 | Fujiwara | B62D 1/195 |
| 9,688,300 | B2* | 6/2017 | Matsumoto | B62D 1/185 |
| 9,707,910 | B2* | 7/2017 | Kakita | B62D 1/19 |
| 9,828,017 | B2 | 11/2017 | Maniwa et al. | |
| 9,828,018 | B2* | 11/2017 | Mihara | B62D 1/184 |
| 2007/0068311 | A1 | 3/2007 | Shimoda et al. | |
| 2008/0252056 | A1 | 10/2008 | Moriyama et al. | |
| 2008/0284150 | A1* | 11/2008 | Yamada | B62D 1/184 280/777 |
| 2012/0186384 | A1 | 7/2012 | Minamigata et al. | |
| 2012/0297917 | A1* | 11/2012 | Mashimo | B62D 1/184 74/493 |
| 2015/0107399 | A1 | 4/2015 | Nagasawa et al. | |
| 2016/0272234 | A1 | 9/2016 | Terasawa et al. | |
| 2017/0029011 | A1* | 2/2017 | Okada | B62D 1/184 |
| 2017/0313346 | A1* | 11/2017 | Yamada | B62D 1/195 |
| 2018/0022375 | A1 | 1/2018 | Sugishita | |
| 2018/0022376 | A1 | 1/2018 | Sugishita | |
| 2018/0029627 | A1* | 2/2018 | Sugishita | B62D 1/184 |
| 2018/0029628 | A1 | 2/2018 | Sugishita | |

FOREIGN PATENT DOCUMENTS

| | | |
|---|---|---|
| EP | 2565103 A1 | 3/2013 |
| EP | 2647544 A1 | 10/2013 |
| EP | 2786914 A1 | 10/2014 |
| JP | 58-033368 U | 3/1983 |
| JP | 2002-104205 A | 4/2002 |
| JP | 2007-223383 A | 9/2007 |
| JP | 2008-114788 A | 5/2008 |
| JP | 2008254510 A | 10/2008 |
| JP | 2008-265646 A | 11/2008 |
| JP | 2009-029152 A | 2/2009 |
| JP | 2011-006056 A | 1/2011 |
| JP | 2011037357 A | 2/2011 |
| JP | 2013023040 A | 2/2013 |
| JP | 2014-104871 A | 6/2014 |
| WO | 2014/163113 A1 | 10/2014 |

OTHER PUBLICATIONS

International Search Report of PCT/JP2016/064801 dated Aug. 9, 2016 [PCT/ISA/210].
Communication dated Apr. 2, 2018 from the United States Patent and Trademark Office in counterpart U.S. Appl. No. 15/551,346.
Communication dated Dec. 7, 2017 from the United States Patent and Trademark Office in counterpart U.S. Appl. No. 15/551,346.
Communication dated Jun. 5, 2018, issued by the European Patent Office in corresponding European Application No. 16796540.9.
Communication dated Jun. 8, 2018 from the State Intellectual Property Office of the P.R.C. in counterpart Chinese application No. 201680028203.9.

* cited by examiner

STEERING DEVICE

CROSS REFERENCE TO RELATED APPLICATIONS

This application is a National Stage of International Application No. PCT/JP2016/064797, filed May 18, 2016, claiming priorities based on Japanese Patent Application Nos. 2015-102171, filed May 19, 2015 and 2015-203674, filed October 15, 2015, the contents of all of which are incorporated herein by reference in their entirety.

TECHNICAL FIELD

The present invention relates to a steering device including a position adjusting mechanism which enables adjustment of a position of a steering wheel in accordance with a physique and a driving posture of a driver.

TECHNICAL BACKGROUND

A steering device is configured to transmit movement of a steering wheel 1 to a steering gear unit via a steering shaft 2 and give a steering angle to right and left steering wheels 3 as shown in FIG. 28. The steering gear unit is configured to displace (push and pull) a tie rod 6 on the basis of rotation of the steering shaft 2. As such a steering device, a steering device which enables adjustment of a position of the steering wheel 1 in accordance with a physique and a driving posture of a driver is conventionally known.

RELATED ART DOCUMENTS

Patent Document

Patent Document 1:
  Japanese Patent Application, Publication No. 2014-104871
Patent Document 2:
  Japanese Patent Application, Publication No. 2008-265646

SUMMARY OF INVENTION

Technical Problem

Compactification and weight reduction of a steering device including a position adjusting mechanism are required, and high stability thereof is required.

An objective of an aspect of the present invention is to provide a steering device including a position adjusting mechanism with high stability.

Solution to Problem

A steering device according to an aspect of the present invention includes a steering column, a support bracket, and an adjusting rod. The steering column has a configuration in which a front end section of an outer column disposed on a relatively rear side is loosely set (externally engaged) with respect to a rear end section of an inner column disposed at a relatively front side so that a relative displacement therebetween can be applied in an axial direction. The support bracket includes a pair of support plates which are able to be supported by and be fixed to a vehicle body and sandwich a front end section of the outer column from both sides of the support plates in a width direction. The adjusting rod is disposed in a state in which the adjusting rod is inserted through a first through hole (for example, a telescopic adjustment slot or a circular hole) formed in the front end section of the outer column and second through holes (for example, tilt adjustment through holes or circular holes) formed in the support plates in the width direction. Note that, when the steering device is implemented in a structure including a telescopic mechanism, the first through hole is set to be a telescopic adjustment slot which is elongated in the axial direction, and when the steering device is implemented in a structure including a tilt mechanism, the second through holes are set to be tilt adjustment slots which are elongated in a vertical direction. On the other hand, when only any one of the telescopic mechanism and the tilt mechanism is included and the other mechanism is not included, only one of the through holes is set to be a slotted hole/elongated hole, and the other through hole is set to be a circular hole.

In this aspect, one or more slits extending at least in the axial direction of the outer column are formed in the front end section of the outer column. Note that a shape of each of the slits can be formed in a straight linear shape extending in the axial direction and can be formed in a substantially U shape (an angulated U shape) extending in the same direction in a circumferential direction (the vertical direction) from both end sections of the slit in the axial direction (a forward and rearward direction). Moreover, a pair of clamp parts are provided adjacent to the slit and are arranged on portions on both of the sides of the outer column in the width direction such that the clamp parts are bent when an interval between inner surfaces of the pair of support plates is reduced to elastically sandwich an outer circumferential surface of the inner column. In addition, a first surface and a second surface are provided on both lateral surfaces of the outer column in the width direction and are spaced apart from each other in a vertical direction such that each of the pair of clamp parts is arranged therebetween, and such that torque acting on the outer column (for example, torque input to a steering wheel and transmitted via a steering shaft, a key lock collar, and a lock unit) via the first and second surfaces is transmitted to inner surfaces of the support plates.

A steering device according to another aspect of the present invention includes a steering column including an outer column and an inner column, a part of the inner column being enclosed by the outer column; a support bracket attachable to a vehicle body to support the steering column; and a tightening mechanism having a first state in which the steering column is tightened with the support bracket and a second state in which the tightening is released. The outer column includes: a first surface and a second surface arranged spaced apart from each other in a first direction, which intersects an axial direction, and such that the first surface and the second surface are pressed by the support bracket in the first state; and a clamp part arranged between the first surface and the second surface, provided separately from the first surface and the second surface, and such that the clamp part is pressed by the support bracket in the first state.

Advantageous Effects of Invention

According to an aspect of the present invention, a steering device including a position adjusting mechanism with high stability is provided.

DESCRIPTION OF EMBODIMENTS

First Example of Embodiment

Figure 1:
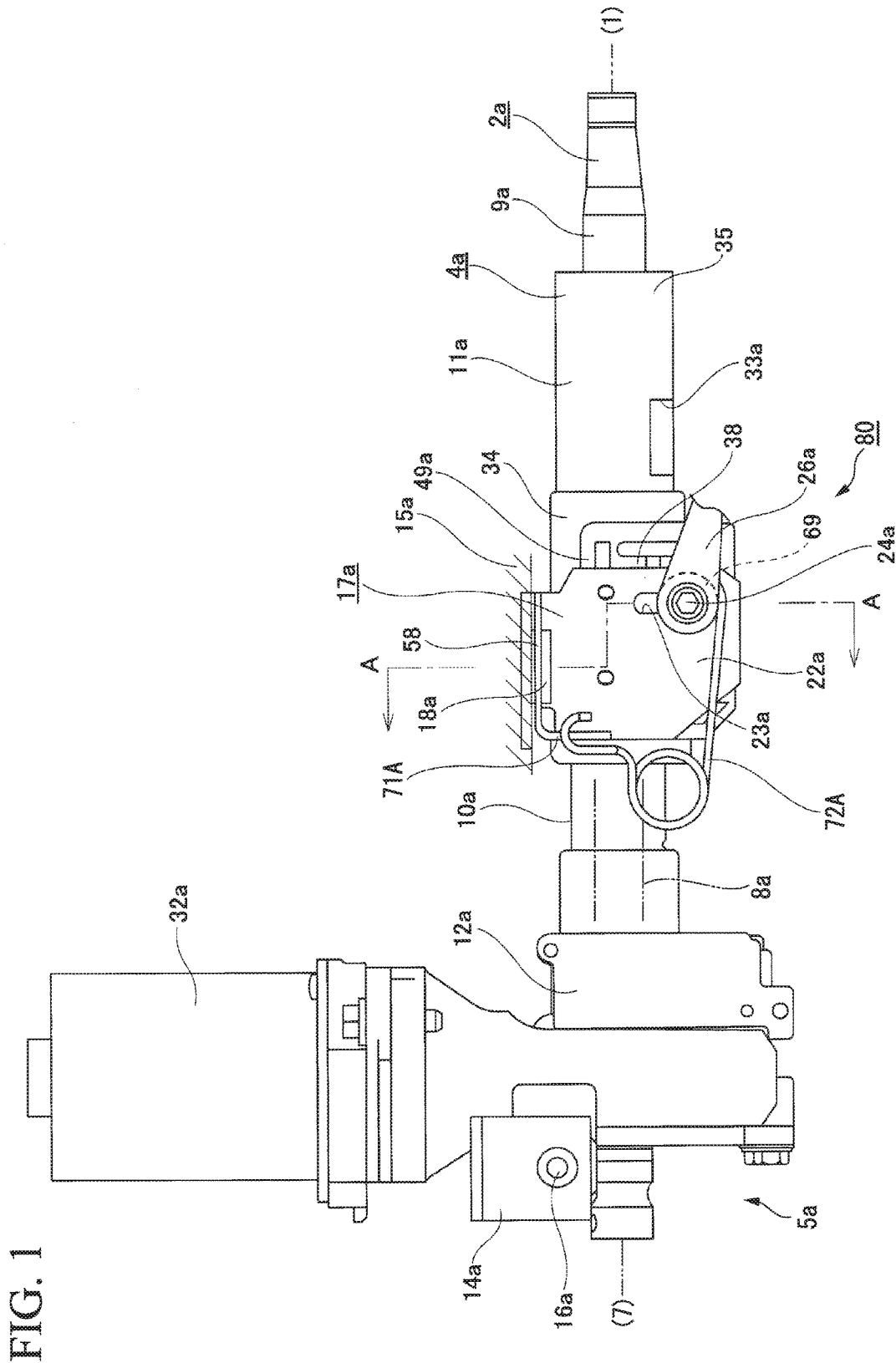
FIG. 1 is a side view of a steering device illustrating a first example according to an embodiment of the present invention.

A first example according to an embodiment of the present invention will be described with reference to FIGS. 1 to 25. A steering device in this example includes a steering wheel 1, a steering shaft 2a, a steering column 4a, a tightening mechanism 80, a steering force auxiliary device 5a (an assist device and an electric power type steering device) 5a, and a steering gear unit 7.

The steering shaft 2a includes an inner shaft 8a disposed relatively forward and an outer shaft 9a disposed relatively rearward. Here, a "forward and rearward direction" is assumed to correspond to a forward and rearward direction of a vehicle body in which the steering device is installed.

The steering column 4a is supported in a vehicle body 15a. For example, the steering column 4a has a cylindrical shape. Alternatively, the steering column 4a can have a shape other than the cylindrical shape. The steering column 4a includes at least a part of the steering shaft 2a. The steering shaft 2a is inserted through the steering column 4a. The steering shaft 2a is rotatably supported on an inner diameter side of the steering column 4a via a plurality of rolling bearings (not shown). A part of the steering shaft 2a is arranged to protrude closer to a rear side than a rear end opening of the steering column 4a. The steering wheel 1 is fixed to a rear end section of the steering shaft 2a.

An electric motor 32a (the assist device 5a) serving as a power source configured to exert an assisting force is disposed near a front end section of the steering column 4a. The electric motor 32a is supported on a gear housing 12a fixed to the front end section of the steering column 4a. A part of the inner shaft 8a is inserted into the gear housing 12a. A front end section of the inner shaft 8a is coupled to a predetermined shaft in the steering force auxiliary device 5a. For example, a shaft joined to the predetermined shaft via a torsion bar or the like in the steering force auxiliary device 5a protrudes from a front end surface of a gear housing 12. Output torque (the assisting force) of the electric motor 32a is exerted on the steering shaft 2a through a speed reducer provided in the gear housing 12a. The gear housing 12a is supported by and fixed to the vehicle body 15a through a lower bracket 14a.

In this example, the steering device includes both a tilt mechanism (an example of a position adjusting mechanism) configured to adjust a vertical position of the steering wheel 1 in accordance with a physique and a driving posture of a driver and a telescopic mechanism (an example of the position adjusting mechanism) configured to adjust a front and rear position of the steering wheel 1. Alternatively, the steering device can include one of the tilt mechanism and the telescopic mechanism without including the other mechanism.

With regard to the telescopic mechanism, the inner shaft 8a and an outer shaft 9a are set to be able to transmit a turning force and to be displaceable with respect to one another in an axial direction. For example, the steering shaft 2a has a spline engagement structure. The inner shaft 8a and the outer shaft 9a are displaced (the steering shaft 2a is extended and contracted) in the axial direction so that a front and rear position of the steering wheel 1 can be adjusted. Furthermore, a total length of the steering shaft 2a can be reduced due to the above-described relative displacement even when a strong impact is received. The steering column 4a includes an inner column 10a disposed relatively forward and an outer column 11a disposed relatively rearward. The inner column 10a is partially inserted into the outer column 11a and is arranged to be movable relative to the outer column 11a in the axial direction. The inner column 10a is partially enclosed by the outer column 9a. A relative position of the inner column 10a and the outer column 11a in the axial direction (an insertion length of the inner column 10a with respect to the outer column 11a) varies so that a total length of the steering column 4a varies. In other words, a front end section of the outer column 11a, which is disposed at a relatively rear side of the steering column 4a, is loosely set with respect to a rear end section of the inner column 10a, which is disposed at a relatively front side of the steering column 4a, so that a relative displacement therebetween can be applied in the axial direction. Thus, the total length of the steering column 4a can be extended and contracted. The steering column 4a is installable on the vehicle body 15a with an upper bracket (a support bracket) 17a. The outer column 11a is supported with respect to the upper bracket 17a to be able to be moved in the forward and rearward direction. The support bracket 17a is supported on the vehicle body 15a through a locking capsule 18a to be able to be detached (drop out) when receiving a strong impact. Here, the "axial direction" is assumed to correspond to an axial direction of the steering shaft 2a or the axial direction of the outer column 11a when there is no special mention.

With regard to the tilt mechanism, one end of the inner column 10a is supported on the vehicle body 15a by the lower bracket 14a through the gear housing 12a. The lower bracket 14a supports the gear housing 12a to be able to freely rock about a tilt shaft 16a disposed in a width direction (to be substantially parallel to the width direction). The steering column 4a is supported on the vehicle body 15a in a manner displaceable by rocking using the tilt shaft 16a installed in the width direction as a center. The outer column 11a is supported on the upper bracket 17a to be movable in a vertical direction. Here, the "width direction" is assumed to correspond to a width direction of the vehicle body in which the steering device is installed when there is no special mention. Furthermore, the "vertical direction" is assumed to correspond to a vertical direction of the vehicle body in which the steering device is installed.

A basic constitution of the steering device in this example is as described above. Next, a constitution of the outer column 11a and peripheral parts thereof will be described in detail.

In this example, the outer column 11a is configured by coupling a frame body (a main body and a sandwiched portion main body) 34 made of a light alloy, such as an aluminum-based alloy and a magnesium-based alloy, and a cylindrical body (a cylindrical member) 35 made of an iron-based alloy such as a carbon steel plate in the axial direction. Alternatively, the outer column 11a is made of a light alloy such as an aluminum-based alloy and a magnesium-based alloy, and can be configured such that the frame body (the main body and the sandwiched portion main body) 34 disposed at a first half thereof and the cylindrical body (the cylindrical member) 35 disposed at a second half thereof are arranged in the axial direction and integrally coupled to each other. Alternatively and/or additionally, the outer column 11a can have other materials and/or other constitutions. The frame body 34 is movably supported on the upper bracket 17a in the forward and rearward direction and the vertical direction. An axial slit 36 (a first slit portion) extending in the axial direction is formed in a lower surface of the frame body 34. A front end section of the axial slit 36 is open in a front end surface of the frame body 34. In addition, circumferential slits 37a and 37b extending in a circumferential direction are formed in a portion near a front end of the frame body 34 and a portion near a rear end thereof in a lower half thereof. The circumferential slit 37a at a front side of the frame body 34 is formed to intersect a portion near a front end of the axial slit 36 in the circumferential direction. The circumferential slit 37b at a rear side of the frame body 34 is formed to intersect a portion near a rear end of the axial slit 36 in the circumferential direction. Clamp parts 38 are formed to enclose both sides of the frame body 34 in the width direction in three directions using the axial slit 36, the circumferential slit 37a, and the circumferential slit 37b.

In the clamp parts 38 and 38, three sides are open to be continuous with the axial slit 36 and the circumferential slits 37a and 37b, and the remaining one side is joined to the frame body 34. That is to say, with respect to the clamp part 38, a non-fixed end is continuously formed at least on two lateral sides, which are arranged to be spaced apart from each other in the axial direction, and on one side in a first direction intersecting the axial direction (a first intersecting direction; a substantially vertical direction in this example). Furthermore, the other side of the clamp part 38 in the first direction is a fixed end. In other words, the clamp part 38 has a cantilever structure with the fixed end extending in the axial direction. The clamp part 38 is lower in rigidity in at least the width direction than other portions of the frame body 34 and is elastically deformable in the width direction (an inner diameter thereof is elastically expandable and contractable). For example, each of the clamp parts 38 and 38 has an inner circumferential surface with a partial cylindrical surface shape. The clamp parts 38 and 38 are provided adjacent to both sides of the axial slit 36 in the circumferential direction. The clamp parts 38 and 38 have a shape in which the clamp parts extend in the axial direction and the circumferential direction (or the first direction). Plate-like projecting plates (projecting parts) 39 and 39 are provided on intermediate portions in the first direction (the substantially vertical direction in this example) of outer surfaces of the clamp parts 38 and 38 in the width direction in a state in which the projecting plates protrude outwardly in the width direction. Acting surfaces (third surfaces, third acting surfaces, and pressed surfaces) 40 and 40 receiving a tightening force of the tightening mechanism 80 are formed on lower end sections (portions lower than the projecting plates 39 and 39) of the outer surfaces of the clamp parts 38 and 38 in the width direction. For example, the acting surface 40 has a flat surface shape. Additionally and/or alternatively, the acting surface 40 can have a shape other than a flat shape. Note that, in this example, the first direction intersects the width direction of the vehicle body and is orthogonal to the axial direction. Alternatively, the first direction can substantially correspond to the circumferential direction of the outer column 11a. Alternatively, the first direction can intersect the axial direction in a different direction from the direction orthogonal to the axial direction. A second direction is assumed to be a direction intersecting the axial direction and the first direction. A substantial tightening direction of the tightening mechanism 80 may coincide with the second direction. In this example, the second direction substantially coincides with the width direction of the vehicle body. Alternatively and/or additionally, the second direction can include directions other than the width direction of the vehicle body.

The outer column 11 a includes a reinforcing bridge part (a reinforcing part, a reinforcing structure, and a reinforcing member) 41 bridged between both sides of the outer column 11a in the second direction (substantially in the width direction of the vehicle body in this example). The reinforcing bridge part 41 is provided to extend to be substantially continuous between both sides of the outer column 11 a in the second direction, and to physically join both sides of the outer column 11a in the second direction. In this example, the reinforcing bridge part 41 is provided on a lower portion of the frame body 34 to cover the clamp parts 38 and 38 from below. The reinforcing bridge part 41 is integrally formed with the outer column 11a. The reinforcing bridge part 41 includes a reinforcing plate 42 and a pair of joining parts 43a and 43b. A shape of the reinforcing bridge part 41 viewed from the width direction is a substantially U shape (an angulated U shape). The reinforcing plate 42 is disposed below the clamp parts 38 and 38 and is provided to extend in the width direction and the forward and rearward direction. The reinforcing plate 42 includes a flat plate (a central flat plate) 44 disposed at a center of the reinforcing plate in the width direction and outer flat plates (lower extension parts) 45 and 45 disposed on both sides of the reinforcing plate in the width direction and below the flat plate 44. The flat plate 44 and the outer flat plate 45 are provided to be continuous through a step part 46. The reinforcing bridge part 41 has a crank-shaped cross section.

In this example, the joining part 43a disposed relatively forward is provided to extend upward from portions (the outer flat plates 45 and 45) on both sides of a front end section of the reinforcing plate 42 in the width direction. The joining part 43a is joined to portions of a lower surface of a front end section of the frame body 34 which are adjacent to a front side of the circumferential slit 37a and are on both sides which surround the axial slit 36 in the circumferential direction. The joining part 43b disposed at the rear side of the reinforcing bridge part 41 is provided to extend upward from a rear end section of the reinforcing plate 42. The joining part 43b is joined to a portion of a lower surface of a rear end section of the frame body 34 which is adjacent to a rear side of a rear end section of the axial slit 36. Alternatively and/or additionally, the reinforcing bridge part 41 can have a different constitution from the above.

In this example, the outer column 11a includes the above-described reinforcing bridge part 41 to have high twisting rigidity. Gaps (slits) 47 and 47 with a substantially U shape (a substantially angulated U shape) when viewed from the width direction (the second direction) are provided between the reinforcing bridge part 41 and the clamp parts 38 and 38. The gaps 47 and 47 have at least telescopic adjustment slots (first through holes, axial slits, and first slit portions) 21a and 21a extending in the axial direction (the axial direction of the outer column 11a and the axial direction of the steering shaft 2a) and the circumferential slits (second slit portions) 37a and 37b provided to be continuous in the slots 21a and 21a and extending in a direction which intersects the slots 21a and 21a. The clamp parts 38 and 38 are provided adjacent to the slots 21a and 21a. The slots 21a and 21a form spaces which are present between distal end sections (lower end sections) of the clamp parts 38 and 38 and upper surfaces of portions on both sides of the flat plate 44 in the reinforcing plate 42 in the width direction. An adjusting rod 24a is inserted through the slots 21a and 21a in the width direction (the second direction).

Roller travel depressed grooves 48 and 48 are provided in portions on both sides of the outer column 11a in the width direction in the axial direction of the slots 21a and 21a. The grooves 48 and 48 are provided in outer portions of the slots 21a and 21a in the width direction. The grooves 48 and 48 are enclosed in three directions by lower surfaces of the projecting plates 39 and 39 provided on the clamp parts 38 and 38, upper surfaces of the outer flat plates 45 and 45 of the reinforcing plate 42, outer surfaces (the acting surfaces 40 and 40) of distal end sections of the clamp parts 38 and 38 in the width direction, and outer surfaces of the step parts 46 and 46 of the reinforcing plate 42 in the width direction. In other words, the grooves 48 and 48 include the lower surfaces of the projecting plates 39 and 39 as first lateral wall surfaces, the upper surfaces of the outer flat plates 45 and 45 as second lateral wall surfaces, the acting surfaces 40 and 40 of the clamp parts 38 and 38 as first bottom surfaces, and the outer surfaces of the step parts 46 and 46 as second bottom surfaces.

The outer column 11a has an acting surface (a first surface, a first acting surface, a first abutting surface, and a torque transmission surface) 49a and an acting surface (a second surface, a second acting surface, a second abutting surface, and a torque transmission surface) 49b which are provided on two lateral surfaces in the width direction. The acting surface 49a and the acting surface 49b are arranged to be spaced apart from each other in the first direction (the first intersecting direction) serving as a direction which intersects the axial direction (the axial direction of the outer column 11a and the axial direction of the steering shaft 2a). Furthermore, the clamp part 38 (and the acting surface 40) is arranged between the acting surface 49a and the acting surface 49b in the first direction. In this example, the adjusting rod 24a is arranged between the acting surface 49a and the acting surface 49b in the first direction, and the acting surface 40 of the clamp part 38 is arranged between the acting surface 49a and the adjusting rod 24a in the first direction. Furthermore, the axial slit 36 (the slot 21a) is arranged between the acting surface 49a and the acting surface 49b in the first direction. In this example, torque (a force in a twist direction) acting on the outer column 11a may be transmitted to inner surfaces of support plates 22a and 22a in the upper bracket 17a via the acting surface 49a and the acting surface 49b.

In this example, the acting surface 49a is arranged within a range of an external form of the inner column 10a in the first direction. The acting surface 49b is arranged outside of the range of the external form of the inner column 10a in the first direction. In addition, the acting surface 49b is arranged outside of a range of an external form of the cylindrical body 35 of the outer column 11a. Furthermore, in the first direction, the acting surface 49a is arranged relatively close to a central axis of the inner column 10a, and the acting surface 49b is arranged relatively away from the central axis of the inner column 10a. Ridge parts 50 and 50 are provided on a portion near a central axis of the outer column 11a in the first direction (or the vertical direction) on both sides of the outer column 11a (the frame body 34) in the width direction to protrude outwardly in the width direction (the second direction). The ridge part 50 is provided to extend in the axial direction of the outer column 11a. The acting surfaces 49a and 49a are provided on distal ends of the ridge parts 50 and 50 (outer surfaces thereof in the width direction). In this example, depressed portions 51a and 51b, which are depressed in the width direction, are provided in portions (front sections and rear sections) on both sides of the ridge parts 50 and 50 in the forward and rearward direction. The acting surfaces 49a and 49a have a shape in which two linear portions extending in the axial direction are joined to the front and rear end sections on both sides of the ridge parts 50 and intermediate portions thereof. On the other hand, the acting surface 49b on a lower side of the outer column 11a is provided on a distal end of the reinforcing plate 42 (the outer flat plates 45 and 45) (a lateral surface thereof in the width direction). Both of the acting surfaces 49a and 49b have a shape in which the acting surfaces 49a and 49b extend in the axial direction of the outer column 11a, and the acting surfaces 49a and 49b have a length longer in the axial direction than that of the clamp part 38. For example, the acting surface 49a and the acting surface 49b have flat surface shapes. Additionally and/or alternatively, the acting surface 49a and the acting surface 49b can have shapes other than flat shapes. The acting surfaces 49a and 49b have rigidity higher in the width direction (the second direction) than those of the clamp parts 38 and 38.

Upper end sections of the joining parts 43*a* and 43*b* in the reinforcing bridge part 41 are joined to be continuous to both end sections of the ridge parts 50 and 50 in the forward and rearward direction. Both end sections of the acting surfaces 49*a* and 49*b* in the forward and rearward direction are joined to each other to be continuous using continuous surfaces (for example, flat continuous surfaces) 52*a* and 52*b* formed on lateral surfaces of the joining parts 43*a* and 43*b* in the width direction to extend in the vertical direction. The acting surfaces 49*a* and 49*b* and the continuous surfaces 52*a* and 52*b* are formed in substantially rectangular frame shapes. In this example, the acting surfaces 49*a* and 49*b* and the continuous surfaces 52*a* and 52*b* are located on the same virtual plane and are located slightly closer to outer sides of the projecting plates 39 and 39 in the width direction than end surfaces of the projecting plates 39 and 39 in the width direction.

A locking depressed groove 53 extending in the circumferential direction is formed in an inner circumferential surface of a front end section of the outer column 11*a* (the frame body 34). For example, a slide member 54, which is made of a synthetic resin with excellent slidability such as a polyamide resin, a polyacetal resin, and a polytetrafluoroethylene resin and having a whole shape in a substantially C shape, is attached in the locking groove 53 and the axial slit 36. Alternatively and/or additionally, the slide member 54 can include other materials and/or other constitutions. The slide member 54 includes a slide part main body 55 and a pair of support arms 56 and 56 with a partial circular arc shape extending from both sides of the slide part main body 55 in the width direction. The slide part main body 55 is disposed in the axial slit 36. The support arms 56 and 56 are disposed in the locking groove 53. In a state in which the slide member 54 is mounted, an upper surface of the slide part main body 55 and an inner circumferential surface of the frame body 34 are located on the same imaginary cylindrical surface or slightly protrude inwardly therefrom in a radial direction. A pair of depressed portions 57 and 57, which are depressed in the axial direction, are formed in the slide part main body 55. The two depressed portions 57 and 57 are arranged adjacent to each other in the width direction (the circumferential direction). The slide part main body 55 is set to have relatively low rigidity in the vertical direction.

Note that, in this example, particularly with regard to a basic constitution of the outer column 11*a*, a brief description from another viewpoint will be provided. A pair of sandwiched plates are integrally formed with the outer column 11*a* in a state in which the axial slit 36 is sandwiched from both sides thereof in the width direction by the sandwiched plates, and distal end sections (lower end sections) of the sandwiched plates are joined to the outer column 11*a* in the width direction in this example (by a portion corresponding to the reinforcing plate 42). Moreover, outer surfaces of the sandwiched plates in the width direction are set as tightening surfaces with a substantially flat surface shape. The gaps (slits) 47 and 47 with the substantially U shape and which communicate with an inner circumferential surface of the outer column 11*a* are formed in substantially central positions of the tightening surfaces, and portions enclosed by the gaps 47 and 47 are set as the clamp parts 38 and 38. Moreover, upper sides and lower sides of the tightening surfaces are set as the acting surfaces 49*a* and 49*b*.

Figure 2:
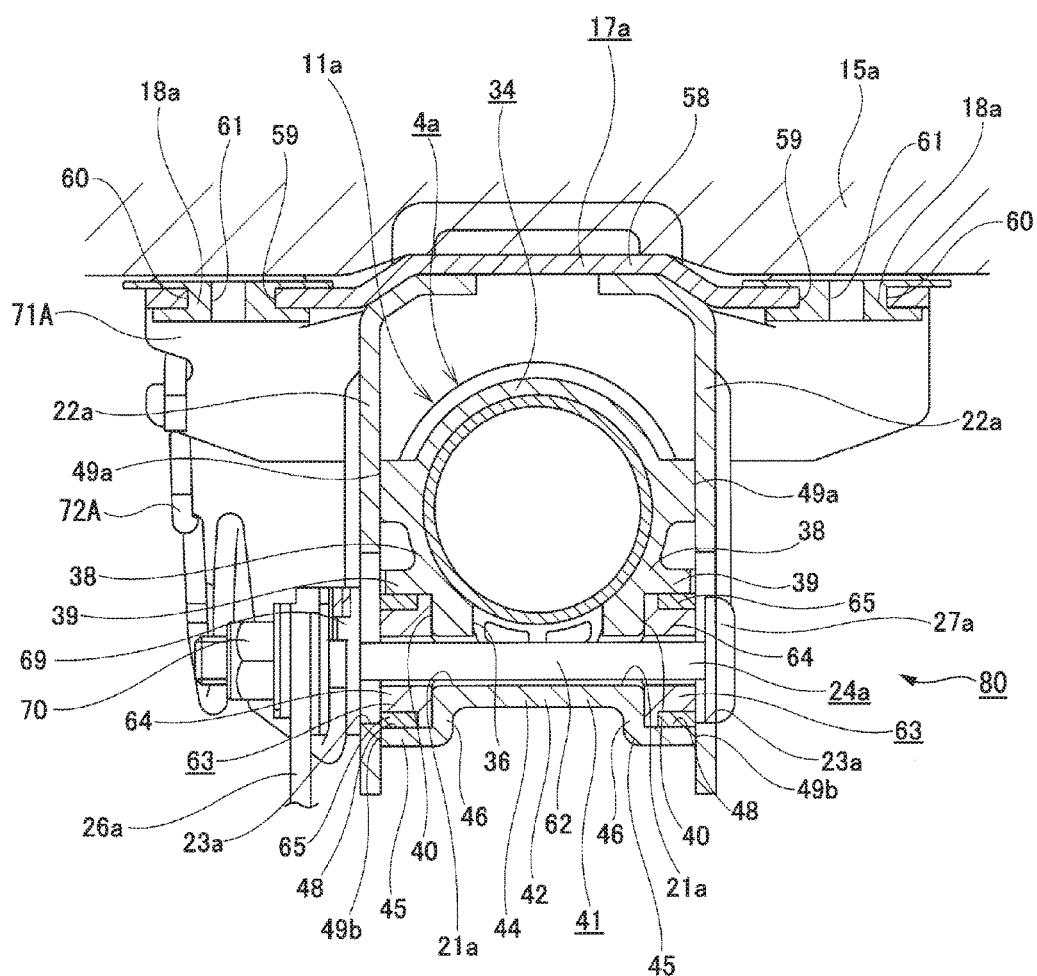
FIG. 2 is an enlarged cross-sectional view taken along line A-O-O-A of FIG. 1.

As shown in FIG. 1 and FIG. 2, the upper bracket (the support bracket) 17*a* is made of, for example, a metal plate of steel, an aluminum-based alloy, or the like with sufficient rigidity. The upper bracket 17*a* includes an attachment plate 58 and the pair of the support plates 22*a* and 22*a*. For example, the attachment plate 58 has an L-shaped cross section. Alternatively and/or additionally, the attachment plate 58 can have other materials and/or other shapes. The attachment plate 58 is normally supported on the vehicle body 15*a*. The attachment plate 58 is configured such that the attachment plate 58 is detached forward and a forward displacement of the outer column 11*a* is allowed on the basis of an impact such as a secondary collision. A pair of locking cutouts 59 and 59 are formed in a rear edge of the attachment plate 58 in a state in which the locking cutouts 59 and 59 are open. The locking capsules 18*a* and 18*a* fixed to the vehicle body 15*a* using fixing members such as bolts or studs are locked into the locking cutouts 59 and 59. Locking grooves 60 and 60 configured to be engaged with right and left edge portions of the locking cutouts 59 and 59 are formed in right and left lateral surfaces of the locking capsules 18*a* and 18*a*, and through holes 61 and 61 through which both of the fixing members are inserted are formed in central portions of the locking capsules 18*a* and 18*a*.

The support plates 22*a* and 22*a* are provided to hang from an attachment plate 55. Furthermore, the support plates 22*a* and 22*a* are provided to be parallel to each other in a state in which the front end section (the frame body 34 and the reinforcing bridge part 41) of the outer column 11*a* is sandwiched from both sides thereof in the width direction by the support plates 22*a* and 22*a*. The pair of support plates 22*a* and 22*a* are arranged on both of the sides of the outer column 11*a* in the width direction (the second direction). At least tilt adjustment slots (second through holes) 23*a* and 23*a* extending in the vertical direction (the first direction) are formed in the support plates 22*a* and 22*a*. The slots 23*a* and 23*a* are provided in opposing positions (positions matching each other) in the width direction. Furthermore, the slots 23*a* and 23*a* are provided to match a portion of telescopic adjustment slots 21*a* and 21*a* in the forward and rearward direction. The slots 23*a* and 23*a* have long axes in the vertical direction (the first direction). The support plates 22*a* and 22*a* are arranged to be able to tighten the outer column 11*a* (the steering column 4*a*) using the tightening mechanism 80. The tightening mechanism 80 includes the adjusting rod 24*a*, an adjusting nut 25, an adjusting lever 26*a*, and the like. The adjusting rod 24*a* is inserted through the telescopic adjustment slots 21*a* and 21*a* and the tilt adjustment slots 23*a* and 23*a* in the width direction.

Figure 18:
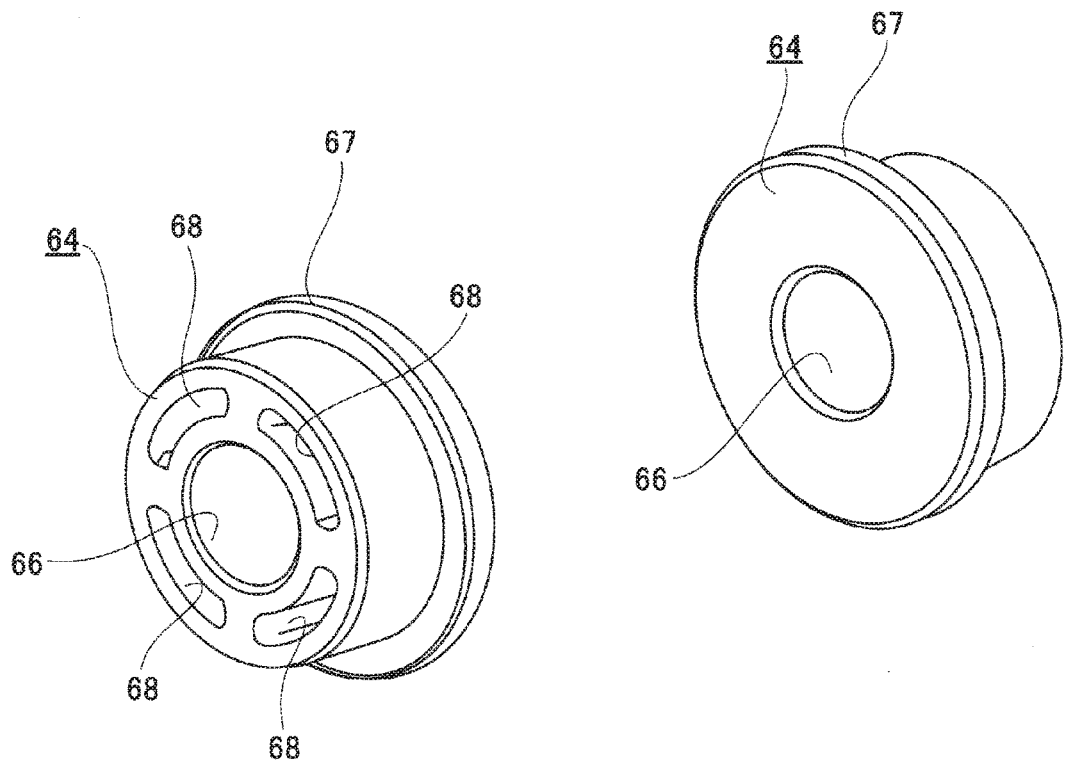
FIG. 18 is a perspective view showing a pair of right and left rollers.
Figure 19:
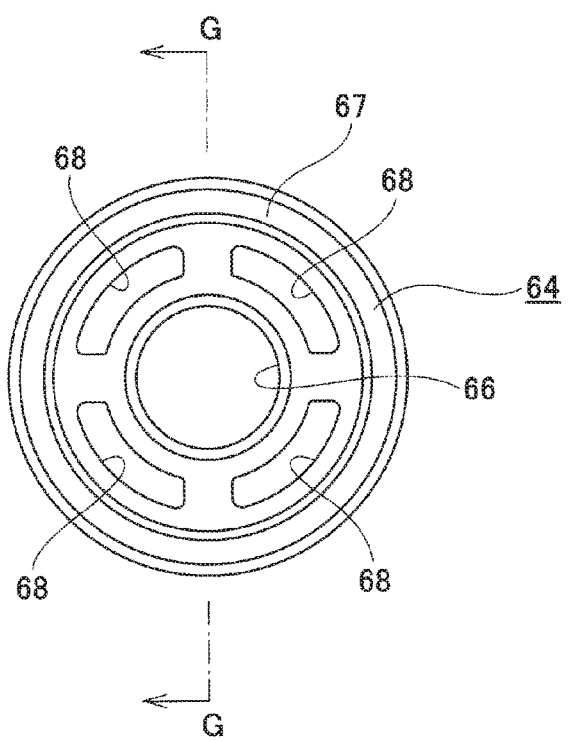
FIG. 19 is a front view of one roller.
Figure 20:
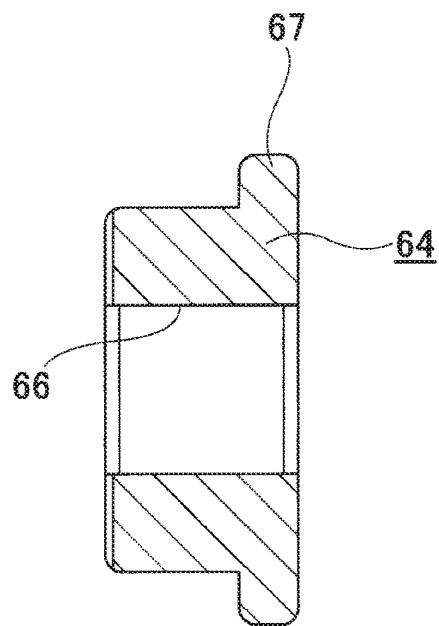
FIG. 20 is a cross-sectional view taken along line G-G of FIG. 19.
Figure 21:
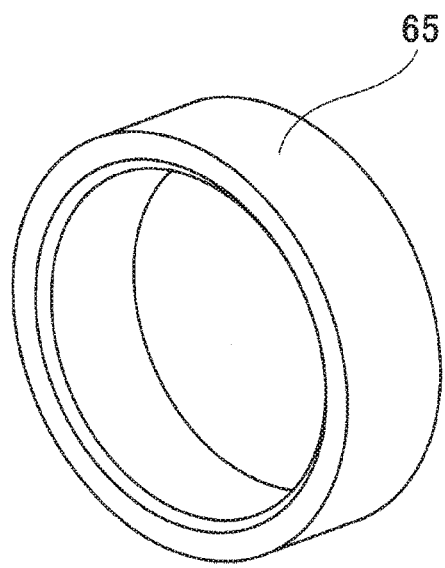
FIG. 21 is a perspective view showing a collar.
Figure 22:
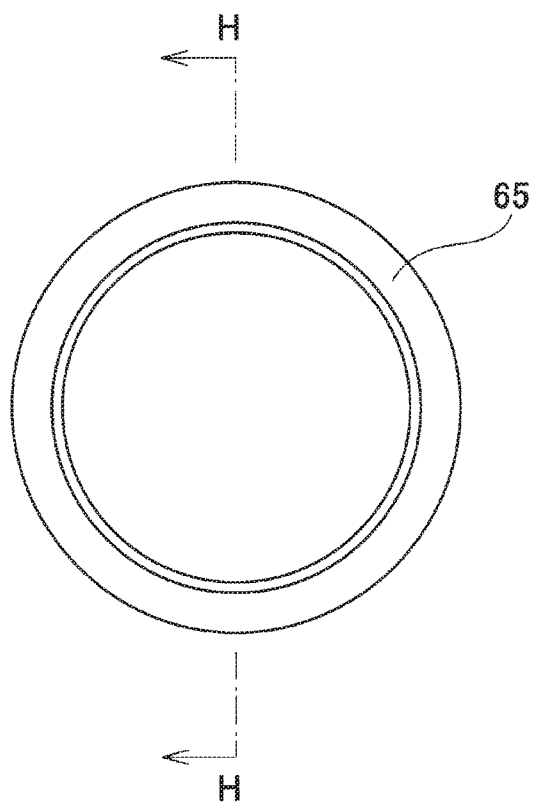
FIG. 22 is a front view of the collar.
Figure 23:
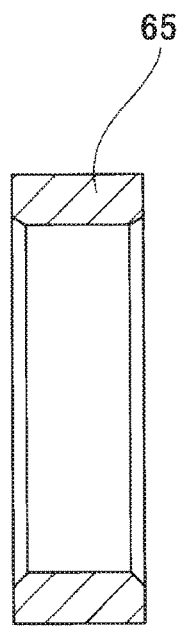
FIG. 23 is a cross-sectional view taken along line H-H of FIG. 22.
Figure 24:
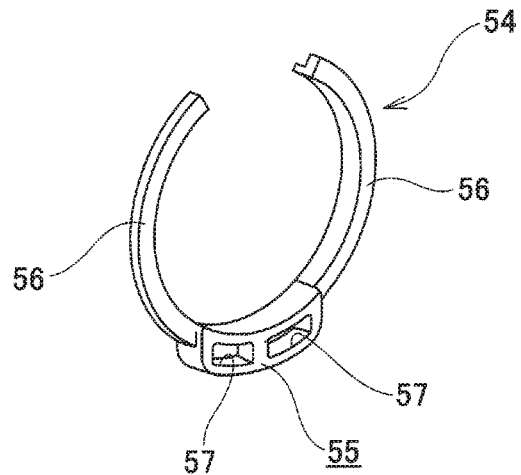
FIG. 24 is a perspective view showing a slide member.
Figure 25:
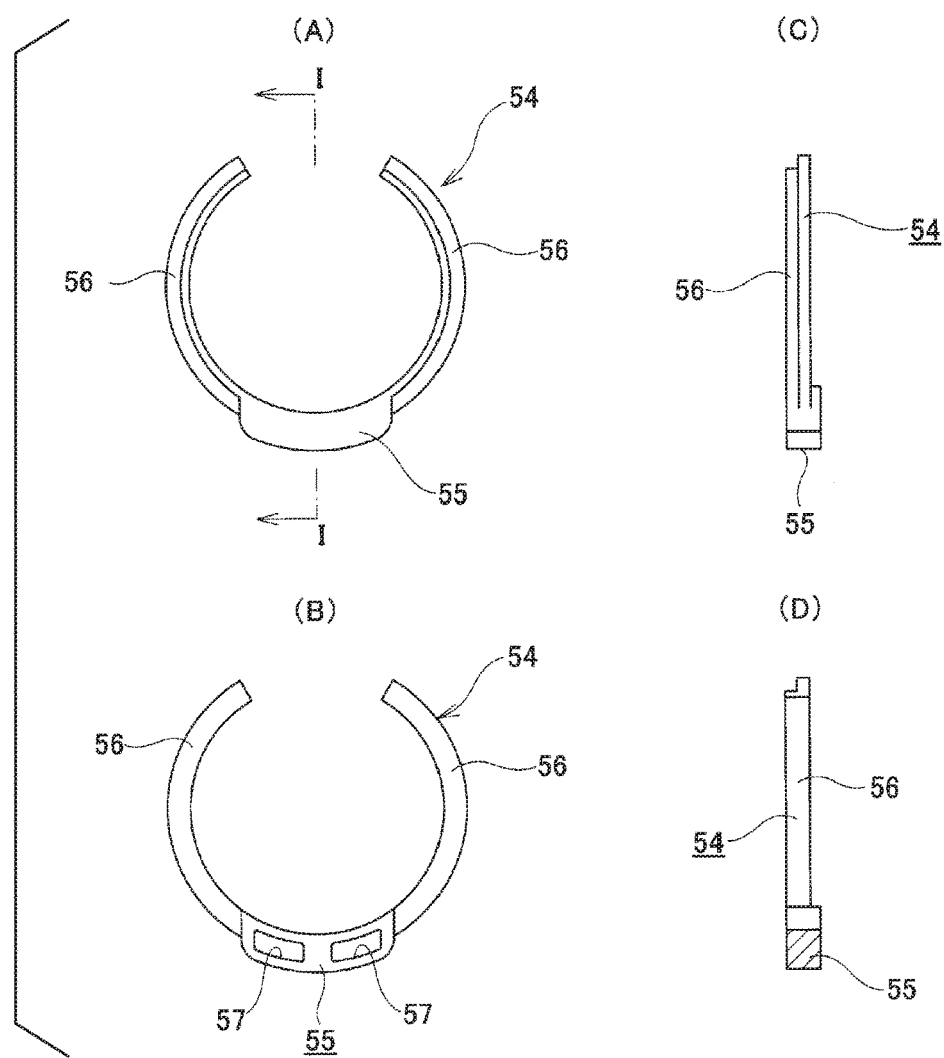
FIG. 25 shows the slide member, and part (A) is a front view, part (B) is a rear view, part (C) is a side view, and part (D) is a cross-sectional view of line I-I of part (A).

The adjusting rod 24*a* includes an anchor part 27*a* disposed on one end section, a male screw part formed in the other end section, and a shaft part 62 formed on an intermediate portion in the width direction (the axial direction of the adjusting rod 24*a*; the second direction). In this example, a pair of rollers 63 and 63 are rotatably supported on the shaft part 62 in a state in which the rollers are spaced apart from each other in the width direction. The rollers 63 and 63 are constituted of, for example, roller bodies 64 and 64 made of a metal and collars 65 and 65 manufactured by an elastic material made of a synthetic resin such as a polyamide resin (nylon) and a polytetrafluoroethylene (PTFE) resin or rubber. Alternatively and/or additionally, the rollers 63 and 63 can include other materials and/or other constitutions. The roller bodies 64 and 64 have a substantially cylindrical shape, as shown in FIGS. 18 to 20. Through holes 66 and 66 through which the shaft part 62 is inserted are formed in central portions of the roller bodies 64 and 64. Flanges 67 and 67 with an outward flange shape are formed on end sections of outer circumferential surfaces of the roller bodies 64 and 64 in the width direction. Thin parts 68 and 68 with a circular arc cross section, which are depressed in the width direction, are formed on intermediate portions of the roller bodies 64 and 64 in a radial direction at a plurality of (four in the illustrated example) locations at equal circumferential intervals in the circumferential direction. The collars 65 and 65 have a cylindrical shape as shown in FIGS. 21 to 23. A thickness dimension of the collars 65 and 65 is larger than a height dimension of the flanges 67 and 67 in a radial direction. In the rollers 63 and 63 in this example, the collars 65 and 65 are press-fitted to (externally engaged with) portions of the outer circumferential surfaces of the roller bodies 64 and 64 which are shifted from the flanges 67 and 67 in the width direction. Alternatively, one long/elongated roller which is continuously elongated in the width direction can also be used in the width direction instead of a pair of rollers, or the whole roller can be made of a synthetic resin or rubber.

Outer end surfaces of the rollers 63 and 63 in the width direction are located slightly closer to an outer side in the width direction than end surfaces of the projecting plates 39 and 39 in the width direction in a state in which the adjusting rod 24a is inserted through the telescopic adjustment slots 21a and 21a and the tilt adjustment slots 23a and 23a, and the rollers 63 and 63 are disposed in the roller travel grooves 48 and 48.

The anchor part 27a is provided on one end side of the adjusting rod 24a in the width direction. The anchor part 27a is relatively non-rotatably engaged with the tilt adjustment slot 23a formed in one of the support plates 22a. A cam device 69, which is constituted of a driving-side cam and a driven-side cam, and the adjusting lever 26a are provided in the vicinity of a portion of the adjusting rod 24a (the shaft part 62) which protrudes in the width direction from an outer surface of the other support plate 22a in the width direction. A nut 70 is screwed on the male screw part. The driving-side cam of the cam device 69 is rotated relative to the driven-side cam on the basis of a rocking operation of the adjusting lever 26a in the tightening mechanism 80 so that a width dimension (a dimension of the adjusting rod 24a in the axial direction) of the cam device 69 is expandable and contractable.

In this example, a tilt spring (a tilt flip-up spring or a balance spring) 72A serving as a coil spring is provided in the attachment plate 58 in the upper bracket 17a. The tilt spring 72A is bridged between a bent part 71A provided on a front end section in the attachment plate 58 and the cam device 69 (the driven-side cam). An upward biasing force is exerted on the adjusting rod 24a via the cam device 69 using the tilt spring 72A. The biasing force exerted on the adjusting rod 24a is transmitted to the lower surfaces of the projecting plates 39 and 39 constituting upper sides of the roller travel grooves 48 and 48 via the rollers 63 and 63, and thus the outer column 11a is pressed upward.

Figure 10:
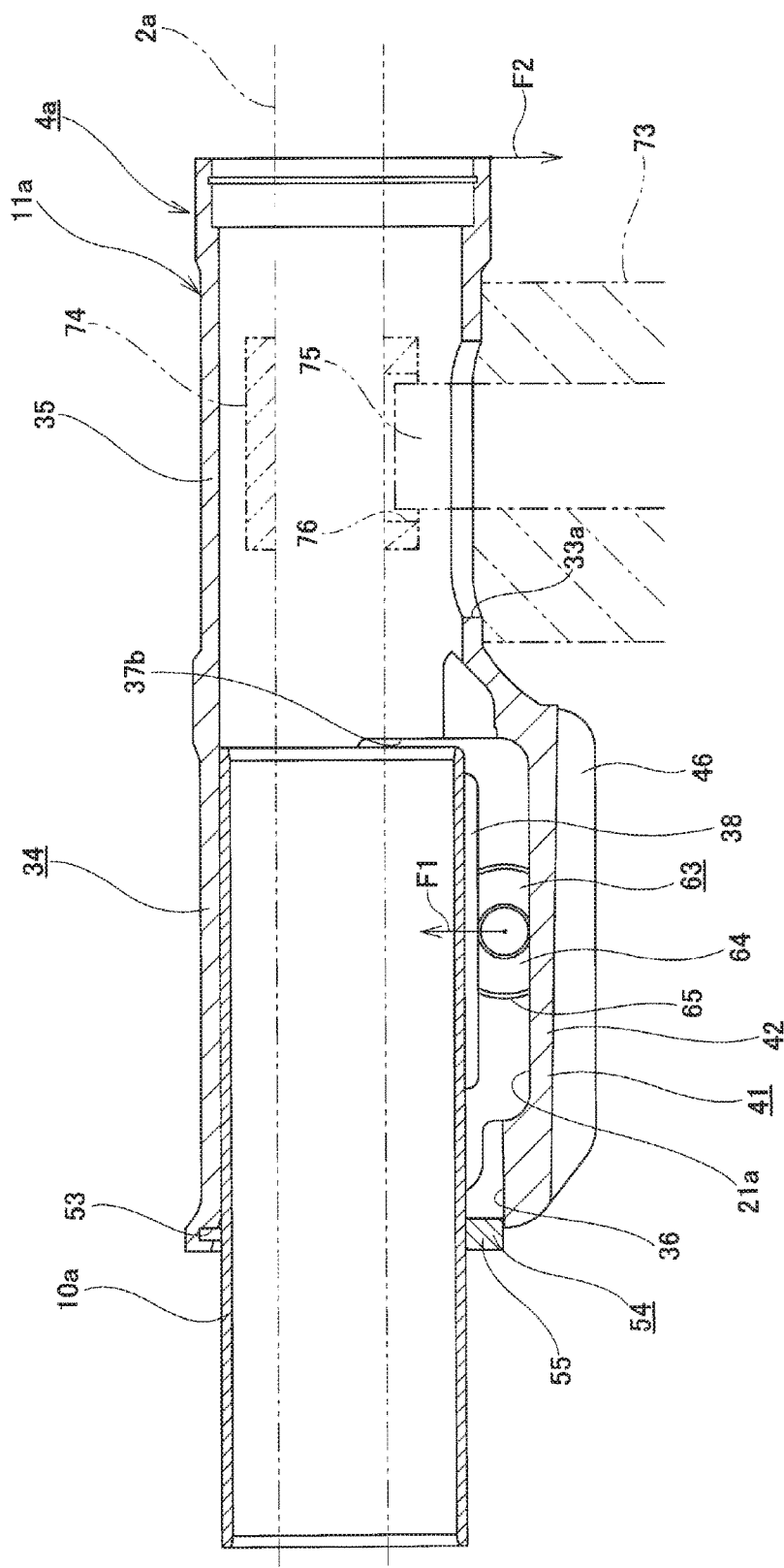
FIG. 10 is a cross-sectional view taken along line D-D of FIG. 7.
Figure 11:
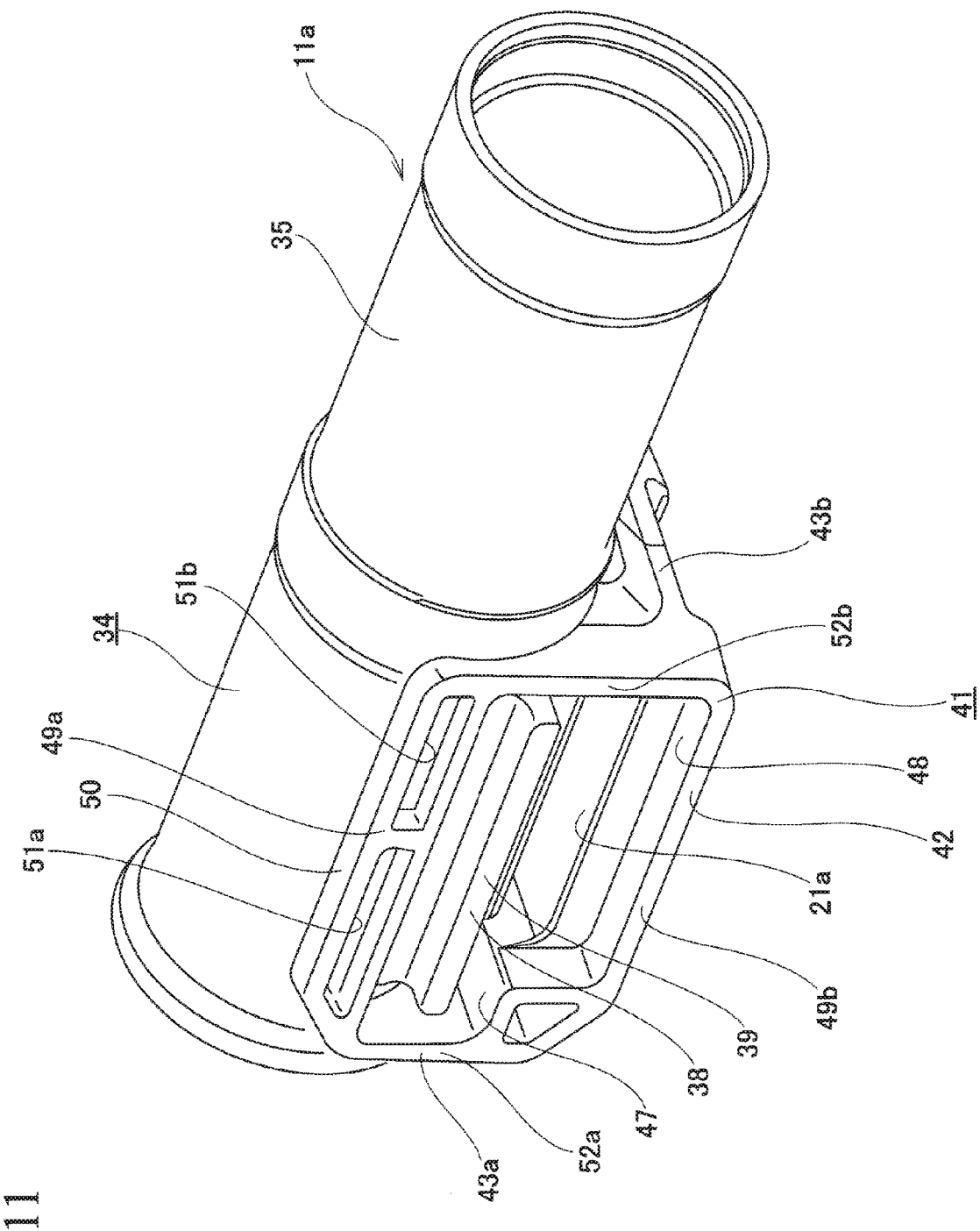
FIG. 11 is a perspective view showing an outer column.
Figure 12:
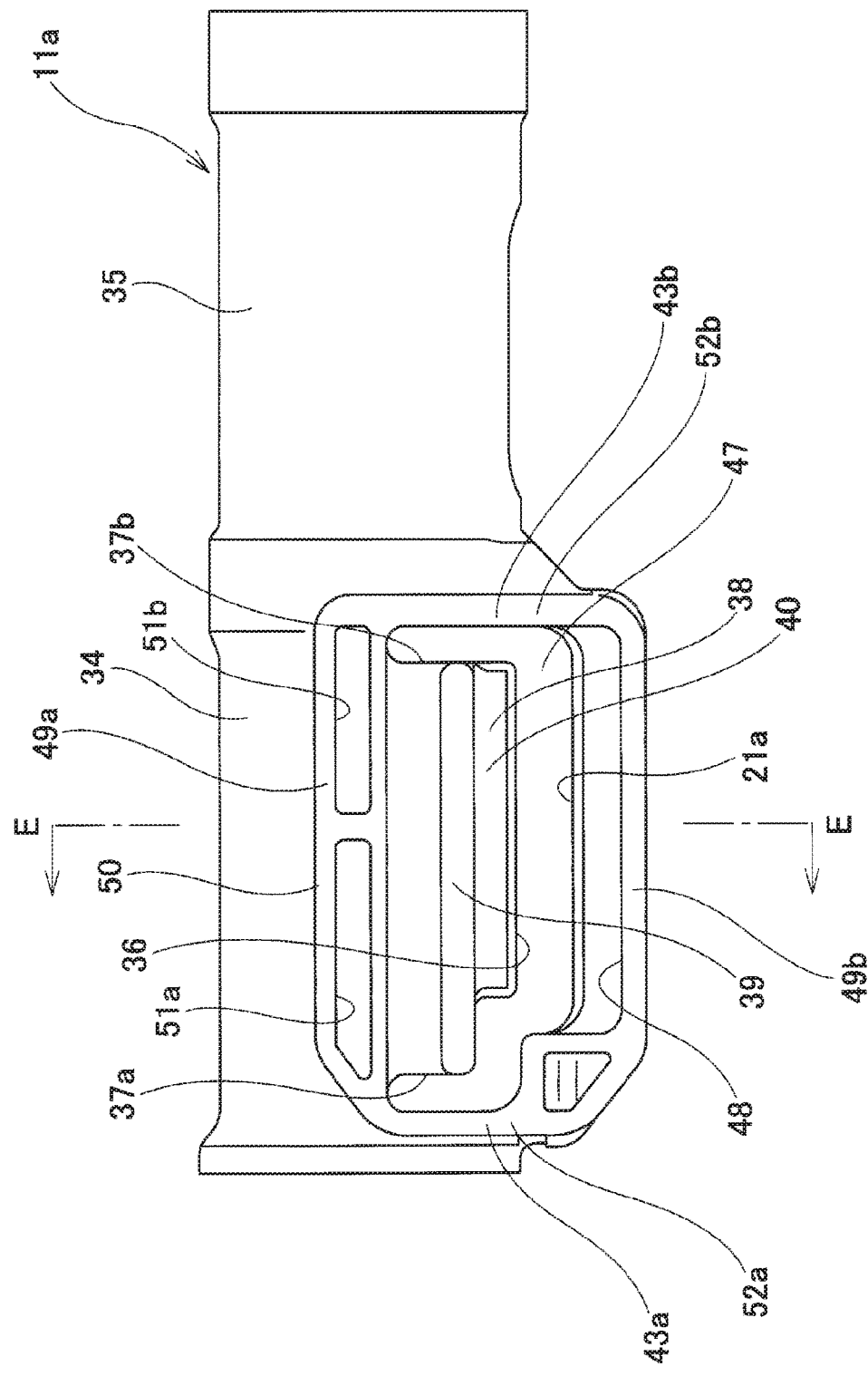
FIG. 12 is a side view of the outer column.
Figure 13:
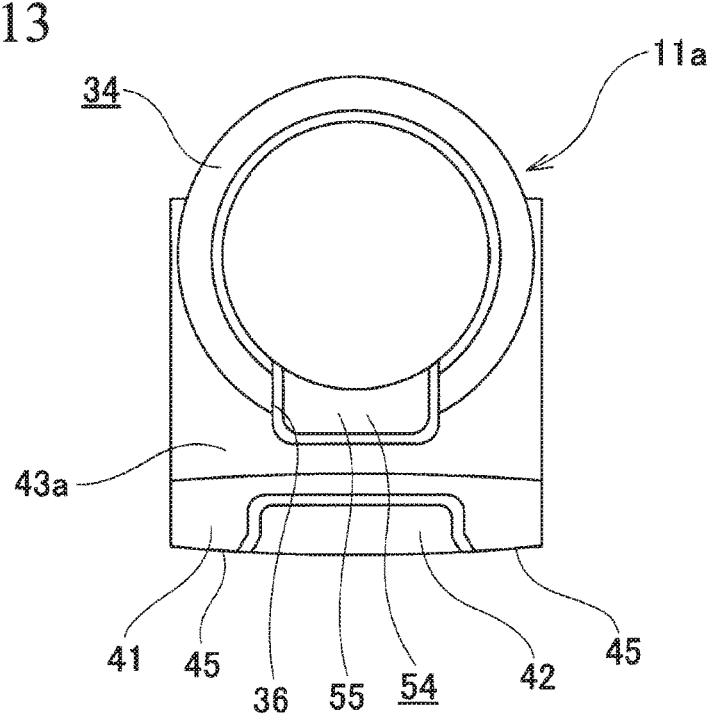
FIG. 13 is an end view of the outer column viewed from the left side of FIG. 12.
Figure 14:
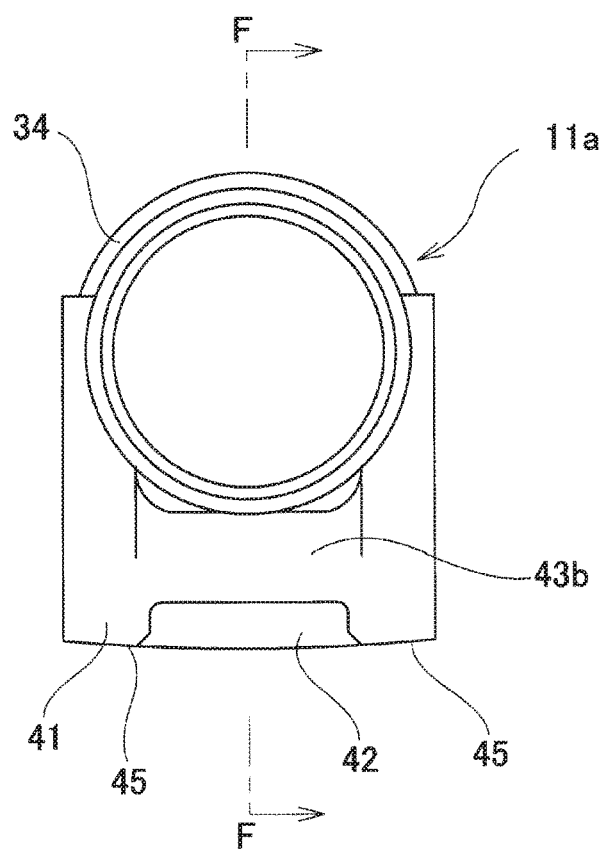
FIG. 14 is an end view of the outer column viewed from the right side of FIG. 12.
Figure 15:
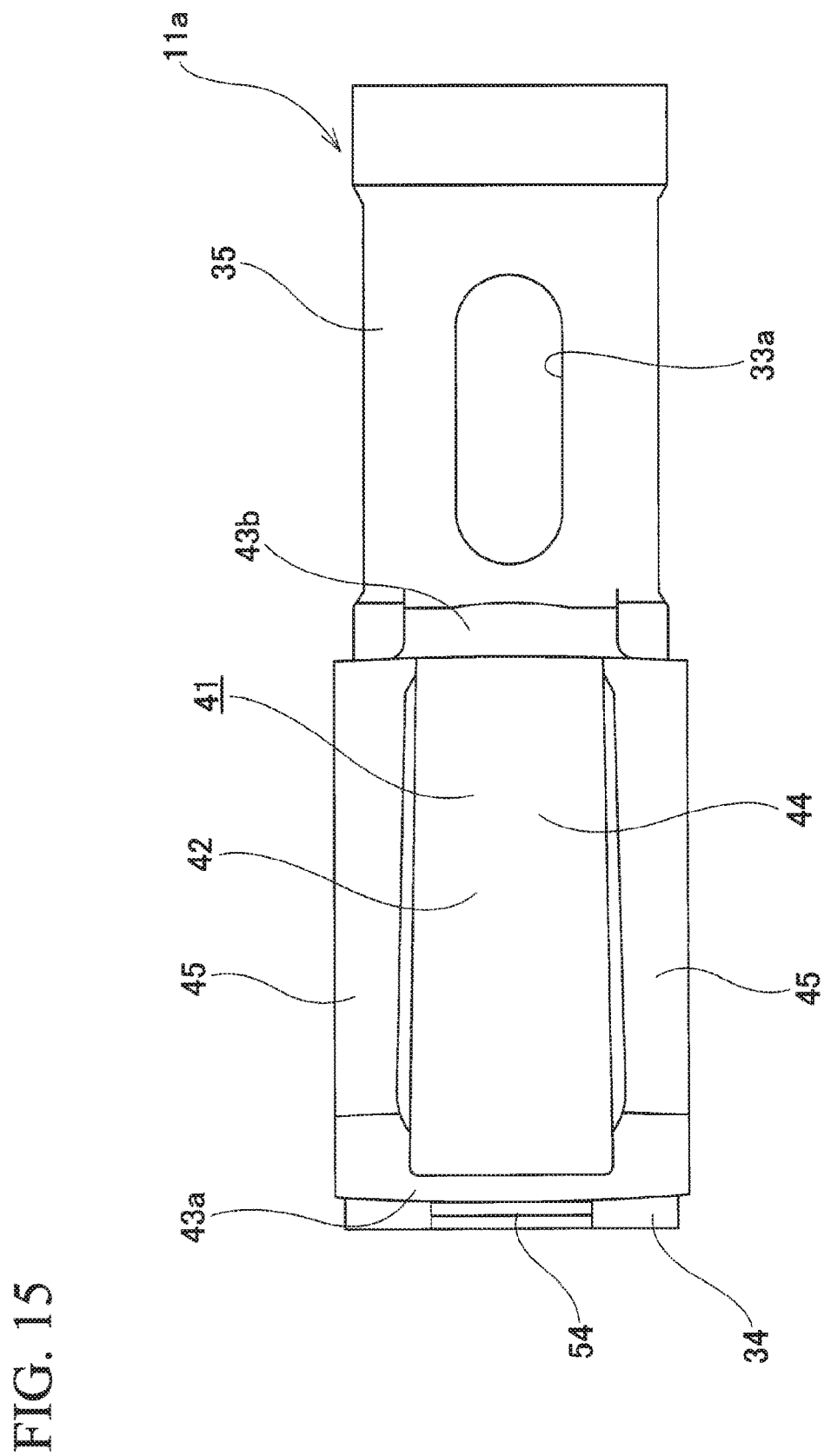
FIG. 15 is a bottom view of the outer column viewed from the bottom side of FIG. 12.
Figure 16:
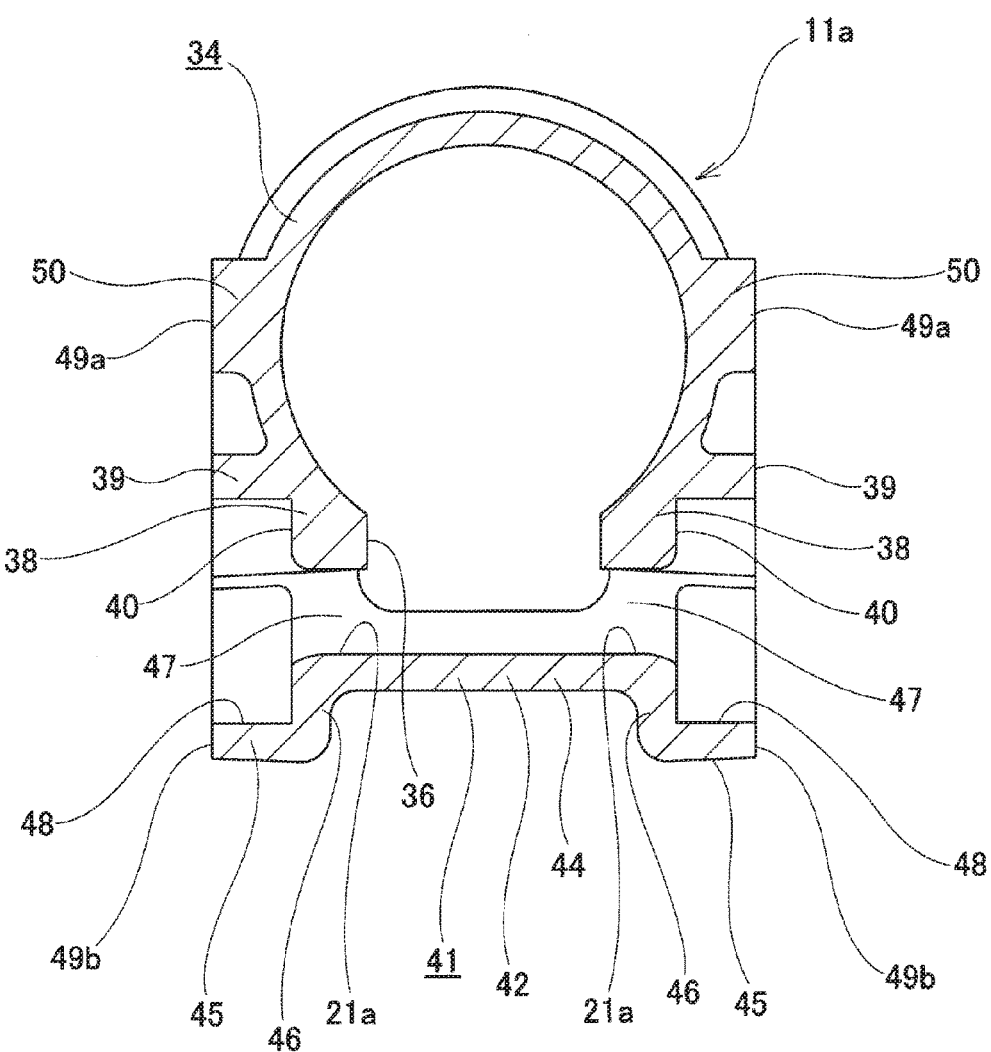
FIG. 16 is an enlarged cross-sectional view taken along line E-E of FIG. 12.
Figure 17:
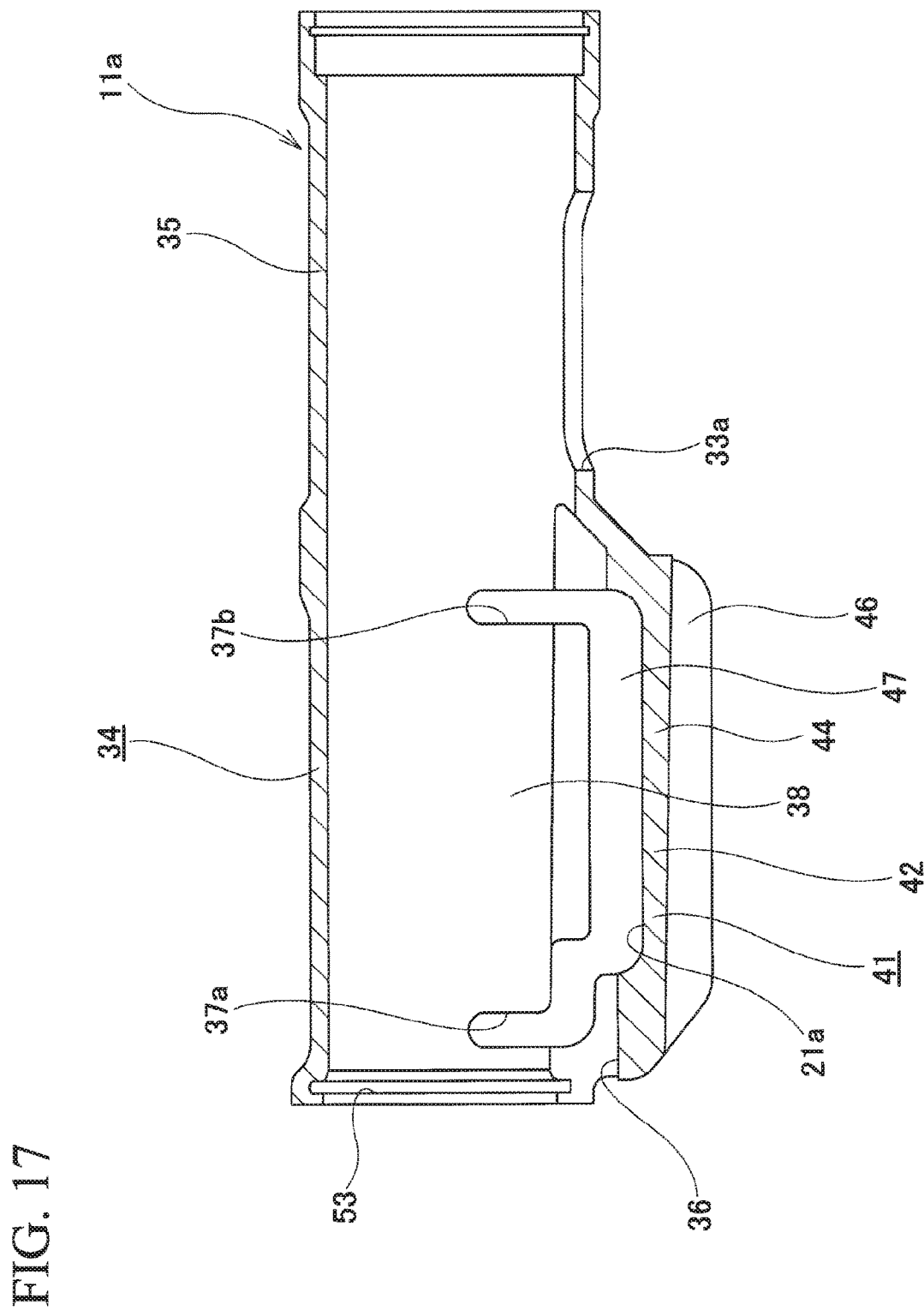
FIG. 17 is a cross-sectional view taken along with line F-F of FIG. 14.
Figure 28:
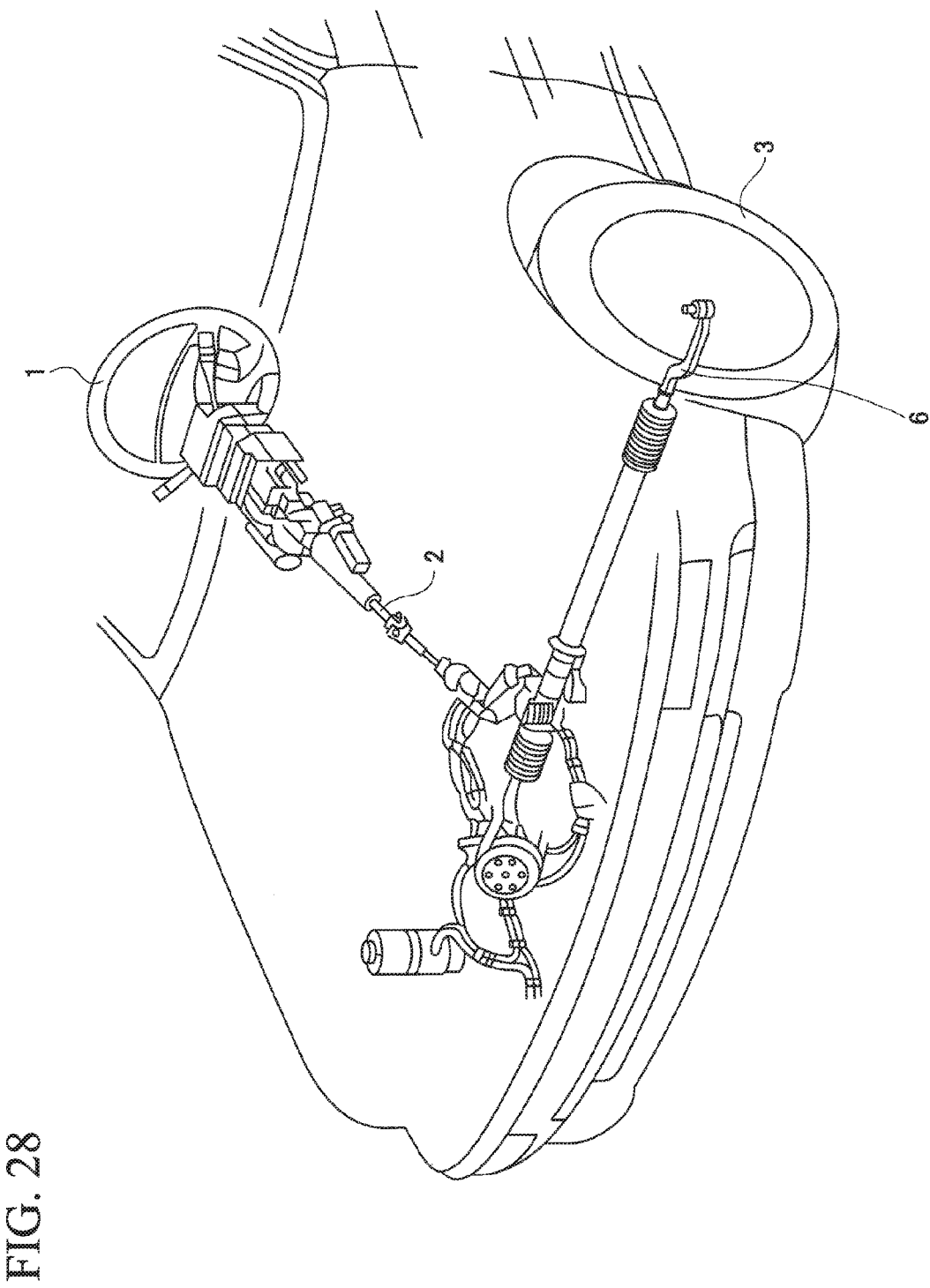
FIG. 28 is a schematic perspective view illustrating an example of a steering device mounted in a vehicle.

In this example, the steering device includes a steering lock device serving as a type of a vehicle anti-theft device. A locking through hole 33a is formed to pass through a portion of the outer column 11a near a front end of the cylindrical body 35 in a radial direction. As shown in FIG. 10, a lock unit 73 is supported by and fixed to the vicinity of the locking through hole 33a, and a key lock collar 74 is externally-fitted (press-fitted) to the steering shaft 2a. The key lock collar 74 is arranged at a portion at which phases of the key lock collar 74 and the lock unit 73 coincide with each other at a part of the steering shaft 2a in the axial direction. When an ignition key is switched off in the lock unit 73, a distal end section of a lock pin 75 is displaced toward an inner diameter of the outer column 11a and is engaged with a key lock depressed portion 76 formed in an outer circumferential surface of the key lock collar 74. Thus, the steering shaft 2a cannot be substantially rotated. That is to say, the key lock depressed portion 76 is engaged with the distal end section of the lock pin 75 in a state in which the steering shaft 2a cannot be substantially rotated at a time of key locking. A predetermined value (for example, a value defined by key lock regulations; a limit value) used to release a non-rotatable state is set for the lock unit 73. Rotation of the steering shaft 2a by a force with an extent that the steering wheel 1 (refer to FIG. 28) is operated by a normal driving posture as it is is prevented. When the steering wheel 1 (refer to FIG. 28) is rotated using a force greater than or equal to the predetermined value, the steering shaft 2a is allowed to rotate with respect to the key lock collar 74 and the steering column 4a.

In this example with the above-described constitution, the tightening mechanism 80 has a first state (a first form and a first mode) in which the outer column 11a (the steering column 4a) is tightened through an upper bracket (a support bracket) 17a, and a second state (a second form and a second mode) in which the tightening is released.

When the steering wheel 1 is moved to a desired position and is then held at a desired position, the adjusting lever 26a of the tightening mechanism 80 is rocked (turned) about the adjusting rod 24a in a predetermined direction (generally, upward). As a result, a width dimension of the cam device 69 increases and an interval between the inner surfaces of the support plates 22a and 22a decreases. The rollers 63 and 63 are pressed inward in the width direction by the inner surfaces of the support plates 22a and 22a. The acting surfaces 40 and 40 (bottom surfaces of the roller travel grooves 48 and 48) formed on the lower end sections (the distal end sections) of the clamp parts 38 and 38 are pressed by inner surfaces of the rollers 63 and 63 in the width direction. The clamp parts 38 and 38 are bent (elastically deformed) inwardly in the width direction (toward an axial center), and an outer circumferential surface of the inner column 10a is elastically sandwiched (held) using the clamps 38 and 38 (is tightened in the tightening direction (the second direction)). Thus, the steering wheel 1 is held in the adjusted position. Furthermore, when the clamp parts 38 and 38 are bent to some extent, the acting surfaces 49a and 49b (and the flat continuous surfaces 52a and 52b) are pressed inwardly in the width direction by the inner surfaces of the support plates 22a and 22a. That is to say, in the first state, the outer column 11a is sandwiched from both of the sides of the outer column 11a in the width direction by the inner surfaces of the support plates 22a and 22a through the acting surfaces 49a and 49b (is tightened in the tightening direction (the second direction)).

On the other hand, when a position of the steering wheel 1 is adjusted, the adjusting lever 26a is rocked (turned) in an opposite direction (generally, downward) to the predetermined direction. As a result, the width dimension of the cam device 69 decreases and the interval between the inner surfaces of the support plates 22a and 22a increases. Since a pressing force on the rollers 63 and 63 by the support plates 22a and 22a decreases, a width dimension between the clamp parts 38 and 38 elastically increases and a holding force of the outer circumferential surface of the inner column 10a decreases (the tightening is released). In the second state, the front and rear position and the vertical position of the steering wheel 1 can be adjusted in a range in which the adjusting rod 24a can be moved within the telescopic adjustment slots 21a and 21a and the tilt adjustment slots 23a and 23a.

In the steering device of this example, the acting surfaces 49a and 49a, the acting surfaces 49b and 49b, and the acting surfaces 40 and 40 of the clamp parts 38 and 38 are provided on both of the sides of the outer column 11 a in the width direction (the second direction and the tightening direction). The acting surfaces 49a and 49a and the acting surfaces 49b and 49b are directly pressed onto the support plates 22a and 22a of the upper bracket 17a in the tightened state (the first state). The acting surfaces 40 and 40 of the clamp parts 38 and 38 are indirectly pressed onto the support plates 22a and 22a through the rollers 63 and 63 in the tightened state (the first state). The acting surface (the first surface) 49a, the acting surface (the second surface) 49b, and the acting surface (the third surface) 40 are substantially independent of each other. The acting surfaces 49a and 49a and the acting surfaces 49b and 49b are provided on the frame body 34 of the outer column 11a, and positions thereof with respect to the inner column 10a do not substantially change, or amounts of displacement thereof are slight while transitioning from the released state (the second state) to the tightened state (the first state). A position of the acting surface 40 of the clamp part 38 with respect to the inner column 10a changes with a relatively large amount of displacement (is displaced toward the inner column 10a) (a displacement surface) while transitioning from the released state (the second state) to the tightened state (the first state). In the first state, the outer column 11a and the support plates 22a and 22a are coupled to each other by a force acting on the acting surfaces 49a and 49a mainly at a position near the central axis of the outer column 11a. In the first state, the outer column 11a and the support plates 22a and 22b are coupled to each other by a force acting on the acting surfaces 49b and 49b mainly at a position away from the central axis of the outer column 11a. In the first state, the inner column 10a is held mainly in the outer column 11a through the clamp part 38 by a force acting on the acting surfaces 40 and 40. Therefore, in the steering device in this example, securing strength of the outer column 11a and securing a holding force of the inner column 10a are simultaneously and independently realized, and a position adjusting mechanism with high stability is provided.

Figure 29:
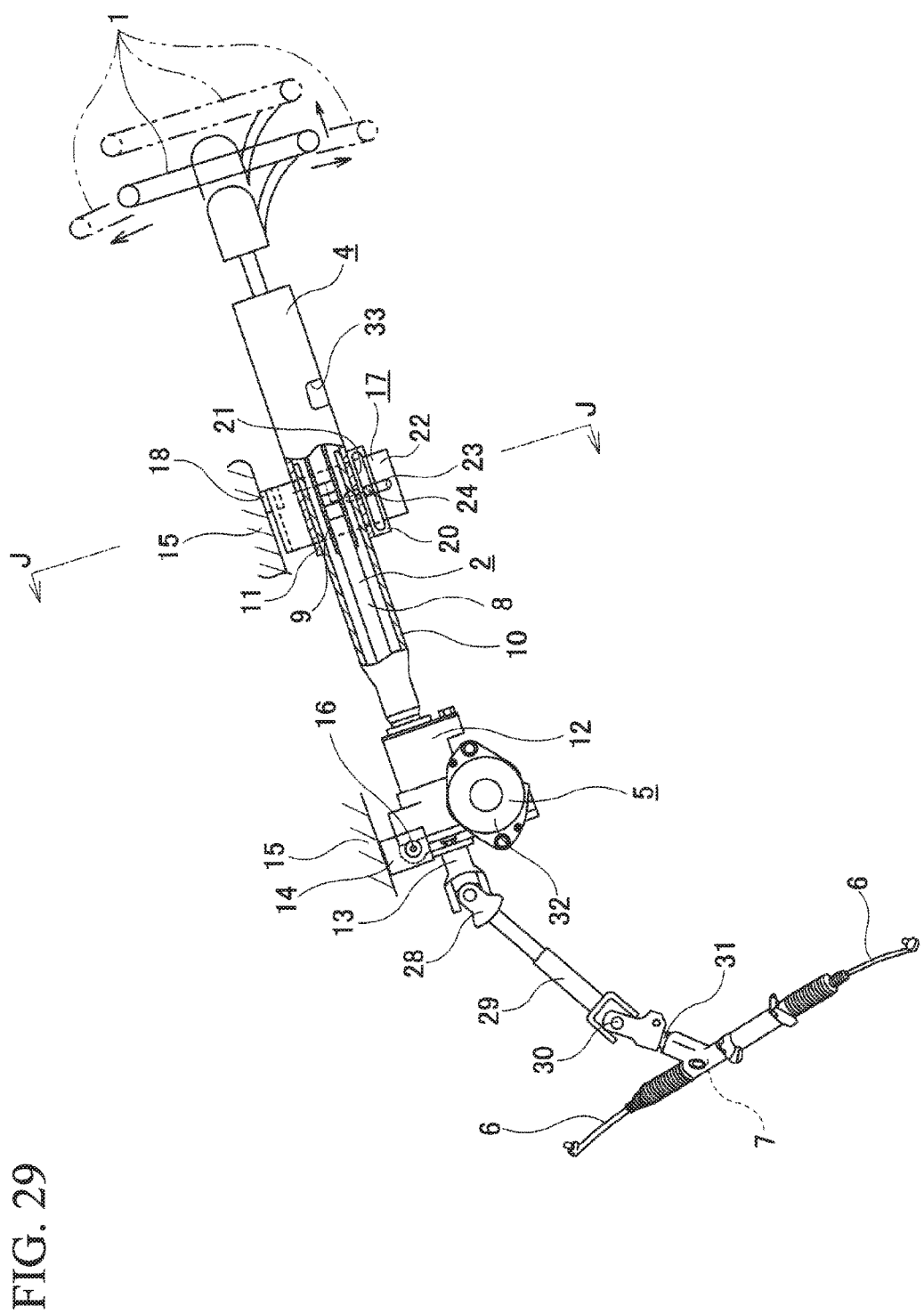
FIG. 29 is a schematic side view illustrating an example of a steering device with a conventional structure.
Figure 30:
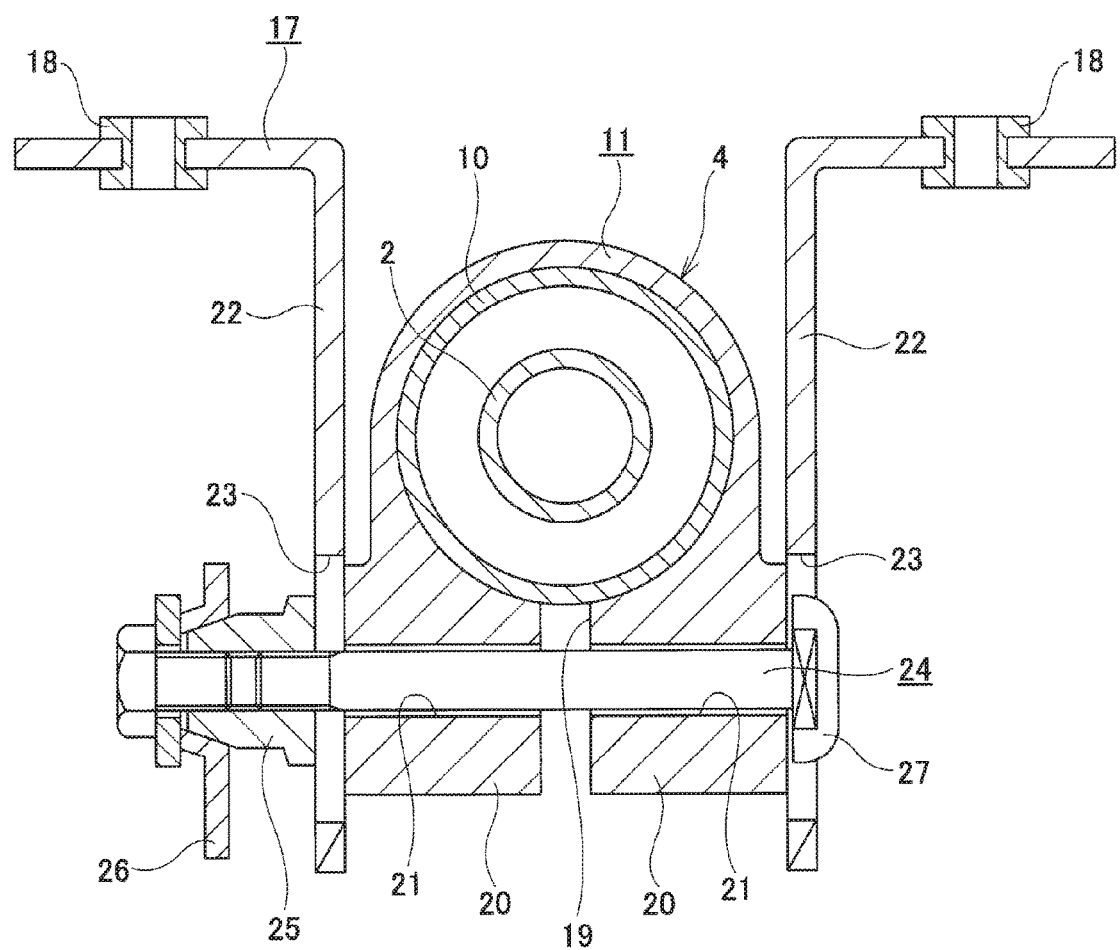
FIG. 30 is a cross-sectional view taken along line J-J of FIG. 29.

FIG. 29 and FIG. 30 illustrate the conventional steering device disclosed in Patent Literature 1. In the conventional steering device, a front and rear position and a vertical position of a steering wheel 1 needs to be able to be adjusted, and an outer column 11 is movably supported on an upper bracket 17 in a forward and rearward direction and a vertical direction. A slit 19 extending in an axial direction of the outer column 11 is formed in a lower surface of a front end section of the outer column 11. A pair of clamp parts 20 and 20 are integrally formed with the outer column 11 in a state in which the slit 19 is sandwiched from both sides thereof in a width direction by the clamp parts 20 and 20. Moreover, telescopic adjustment slots 21 and 21, which are elongated in the forward and rearward direction, are formed at positions in which the clamp parts 20 and 20 are mutually matched. In addition, a pair of support plates 22 and 22 are provided in the upper bracket 17 in a state in which the clamp parts 20 and 20 are sandwiched from both sides thereof in the width direction by support plates 22 and 22. Tilt adjustment slots 23 and 23, which are elongated in the vertical direction, are formed in portions at which the support plates 22 and 22 partially match and which partially match the telescopic adjustment slots 21 and 21 in the forward and rearward direction. An adjusting rod 24 is inserted through the telescopic adjustment slots 21 and 21 and the tilt adjustment slots 23 and 23 in the width direction (the right to the left of FIG. 30) in a state in which the clamp parts 20 and 20 are sandwiched by the support plates 22 and 22 of the upper bracket 17. The adjusting nut 25 is screwed on another end of the adjusting rod 24. The adjusting nut 25 can be rotated through an adjusting lever 26.

In the conventional steering device, the adjusting nut 25 is rotated on the basis of an operation of the adjusting lever 26. The outer column 11 is fixed to the upper bracket 17 or the fixing is released along with a change in an interval between the adjusting nut 25, the anchor part 27, and the adjusting rod 24. In addition, the outer column 11 is fixed to an inner column 10 or the fixing is released along with an interval between the clamp parts 20 and 20. The adjusting rod 24 can be displaced inside the telescopic adjustment slots 21 and 21 in the forward and rearward direction in a state in which an interval between the adjusting nut 25 and the anchor part 27 increases. The outer column 11 is moved forward and rearward (is displaced relative to the inner column 10) in such a displaceable range (a telescopic adjustment range) so that the front and rear position of the steering wheel 1 can be adjusted. In addition, the adjusting rod 24 can be displaced inside the tilt adjustment slots 23 and 23 in a substantially vertical direction. The vertical position of the steering wheel 1 can be adjusted in such a displaceable range (a tilt adjustment range). At this time, a steering column 4 is rocked and displaced about a tilt shaft 16 in the vertical direction.

A front end section of an output shaft 13 in a steering force auxiliary device 5 is joined to a rear end section of an intermediate shaft 29 through a universal joint 28. An input shaft 31 of a steering gear unit 7 is joined to a front end section of the intermediate shaft 29 through another universal joint 30. The steering gear unit 7 includes a rack and a pinion (which are not shown), and the input shaft 31 is coupled to the pinion. Both end sections of the rack meshed with the pinion are joined to tie rods 6 and 6. The tie rods 6 and 6 are pushed and pulled on the basis of a displacement of the rack in the axial direction so that a desired steering angle is given to a steering wheel 3 (refer to FIG. 28). The steering force auxiliary device 5 can give auxiliary torque at a predetermined size in a predetermined direction to the output shaft 13 through a worm speed reducer using an electric motor 32.

In the conventional steering device, when frictional forces between inner surfaces of the support plates 22 and 22 and outer surfaces of the clamp parts 20 and 20 decrease due to an operation in which a position of the steering wheel 1 needs to be able to be adjusted and which is performed through the adjusting lever 26, a rear end section of the outer column 11 is tilted downward in some cases. This is because a downward force acts on the rear end section of the outer column 11 through an outer shaft 9 on the basis of a weight of the steering wheel 1. A gap with a certain size is provided between an inner circumferential surface of the outer column 11 and an outer circumferential surface of the inner column 10 due to relative displacement in the axial direction between the inner column 10 and the outer column 11.

Figure 31:
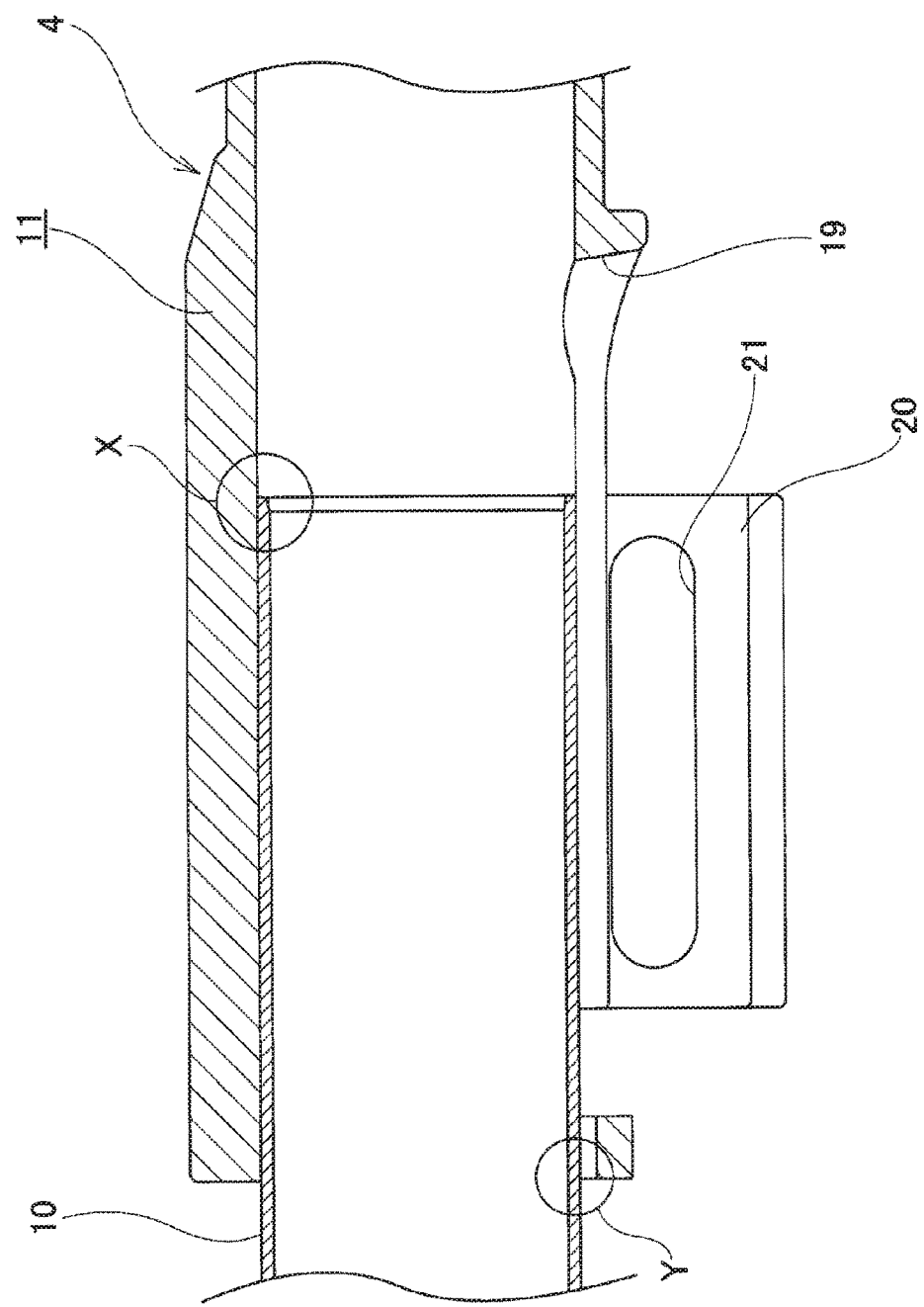
FIG. 31 is a partial cross-sectional view for describing a problem of the steering device with the conventional structure.

In this case, a contact state of a contact portion, which is in a portion X indicated by a circle in FIG. 31, of an upper end section of a rear edge of the inner column 10 and an inner circumferential surface of the outer column 11 is a line contact. In addition, a contact state of a contact portion, which is in a portion Y indicated by a circle in FIG. 31, of a lower end section of a front edge of the outer column 11 and an outer circumferential surface of the inner column 10 is a line contact. As a result, when the front and rear position of the steering wheel 1 needs to be able to be adjusted and the outer column 11 is displaced relative to the inner column 10, the outer column 11 is likely to catch the inner column 10 (to twist). This phenomenon reduces an operational feeling of adjusting the front and rear position of the steering wheel 1 and causes an operational load in the forward and rearward direction to increase. Particularly, in the case of a column type electric power steering device (a column type electric power steering (EPS) device) in which the steering force auxiliary device 5 is combined with a steering column 2 like in the illustrated structure, a fit length of the inner column 10 and the outer column 11 is set to be relatively short due to restrictions on an installation space of the steering column 4. As a result, an angle of inclination of the outer column 11 easily increases, and thus the above-described problem easily occurs. A new problem occurs in that processing costs increase due to precision machining such as a task of reducing a gap between an outer column and an inner column and chamfering performed on an outer circumferential edge of an end section of the inner column.

As shown in FIG. 10, in the steering device in this example, the adjusting rod 24a is biased upward by the tilt spring 72A. Such a biasing force F1 is transmitted to the front end section (the frame body 34) of the outer column 11a via the rollers 63 and 63. The outer column 11a is pressed upward by the biasing force F1 even when a force F2 in a direction in which the rear end section of the outer column 11a is pressed downward is applied to a rear end section of the outer column 11a on the basis of the weight of the steering wheel 1. As a result, a slope of the outer column 11a is zero or can be reduced (the rear end section can be prevented from being tilted downward). In addition, a gap is secured between an upper end section of the inner circumferential surface of the outer column 11a and an upper end section of the outer circumferential surface of the inner column 10a. Therefore, an upper end section in a rear edge of the inner column 10a comes more firmly into line contact with the inner circumferential surface of the outer column 11a. For this reason, the occurrence of catching (twisting) when the front and rear position of the steering wheel 1 is adjusted can be effectively prevented.

In addition, in the steering device in this example, the biasing force exerted on the adjusting rod 24a is transmitted to the outer column 11a (the lower surfaces of the projecting plates 39 and 39) via the rollers 63 and 63. When the front and rear position of the steering wheel 1 needs to be able to be adjusted and the outer column 11a is displaced relative to the inner column 10a in the forward and rearward direction, the rollers 63 and 63 travel (roll) along the lower surfaces of the projecting plates 39 and 39. Frictional resistance generated when the outer column 11a is displaced relative to the inner column 10a in the forward and rearward direction is suppressed compared to when the outer column is directly biased by the adjusting rod. Note that, in a constitution in which no roller is used, a sleeve or the like made of a resin is used for a sliding contact portion between the adjusting rod and the outer column to secure slidability so that sliding resistance can be reduced. However, a surface pressure increases, and a problem easily occurs in terms of durability because an outer circumferential surface of the adjusting rod comes into line contact with the sleeve. On the other hand, in the steering device in this example, a rolling contact is used, and thus such a problem is avoided. Moreover, in the steering device in this example, the collars 65 and 65 made of a synthetic resin are used as outer circumferential surfaces of the rollers 63 and 63, and thus sliding based on contact between metals is avoided and the rollers 63 and 63 can be effectively rotated. Moreover, in the steering device in this example, since the biasing force is exerted on the adjusting rod 24a through the tilt spring 72A, the biasing force is exerted on a whole region of the steering wheel 1 in a forward and rearward adjustment range. Here, the front and rear position of the steering wheel 1 is smoothly adjusted in a state in which the rollers 63 and 63 are sandwiched so that the biasing force is exerted upward.

In addition, in the steering device in this example, since the slide part main body 55 is provided on a lower end section of a front edge of the outer column 11a (the frame body 34), an upper surface of the slide part main body 55 is in contact with an outer circumferential surface of the inner column 11a. As a result, a contact form of a lower end section of a front edge of the outer column 11a and the outer circumferential surface of the inner column 10a is prevented from becoming a line contact. Therefore, catching at such a portion is suppressed, and thus sliding resistance can be prevented from being excessively increased at a time of front and rear position adjustment.

The steering device in this example can be preferably applied even when the total length of the steering column 4a is relatively short. That is to say, the catching (the twisting) at the time of adjusting the front and rear position of the steering wheel 1 is prevented even when a constitution of the column EPS has been adopted, and a high operation feeling is obtained at the time of adjusting the front and rear position of the steering wheel 1, and thus an operational load is suppressed to be small.

In the conventional steering device, for example, the anti-theft steering lock device disclosed in Patent Literature 2 is incorporated in some cases. In this case, a problem is likely to occur in terms of securing durability of the outer column 11. The steering lock device is constituted by mounting the lock unit (a key lock cylinder) around a locking through hole 33 partially formed in the outer column 11, and the key lock collar on a part of the steering shaft 2. In a state in which the ignition key is pulled out, a key lock pin provided in the lock unit is engaged with a key lock hole (a depressed portion) provided in the key lock collar, and thus rotation of the steering shaft 2 with respect to the outer column 10 can be prevented.

When forcible rotation of the steering wheel 1 is attempted in a state in which such a steering lock device has been operated, torque (a twisting force) is sequentially transmitted to the steering shaft 2, the key lock collar, the lock unit, the outer column 11, and the upper bracket 17, and the steering wheel 1 is ultimately supported on the vehicle body 15. Particularly, the torque transmitted from the lock unit is transmitted to the pair of support plates 22 and 22 between the outer column 11 and the upper bracket 17 via the clamp parts 20 and 20, on which a pressing force from the support plates 22 and 22 acts, in the outer column 11 which constitute the upper bracket 17. For this reason, strengths of base portions of the clamp parts 20 and 20 are likely to be insufficient. When thicknesses of the base portions of the clamp parts 20 and 20 are increased (reinforced) to solve such a problem, it is difficult to bend the clamp parts 20 and 20, and thus a holding force of the inner column 10 is less likely to be sufficiently secured.

Figure 3:
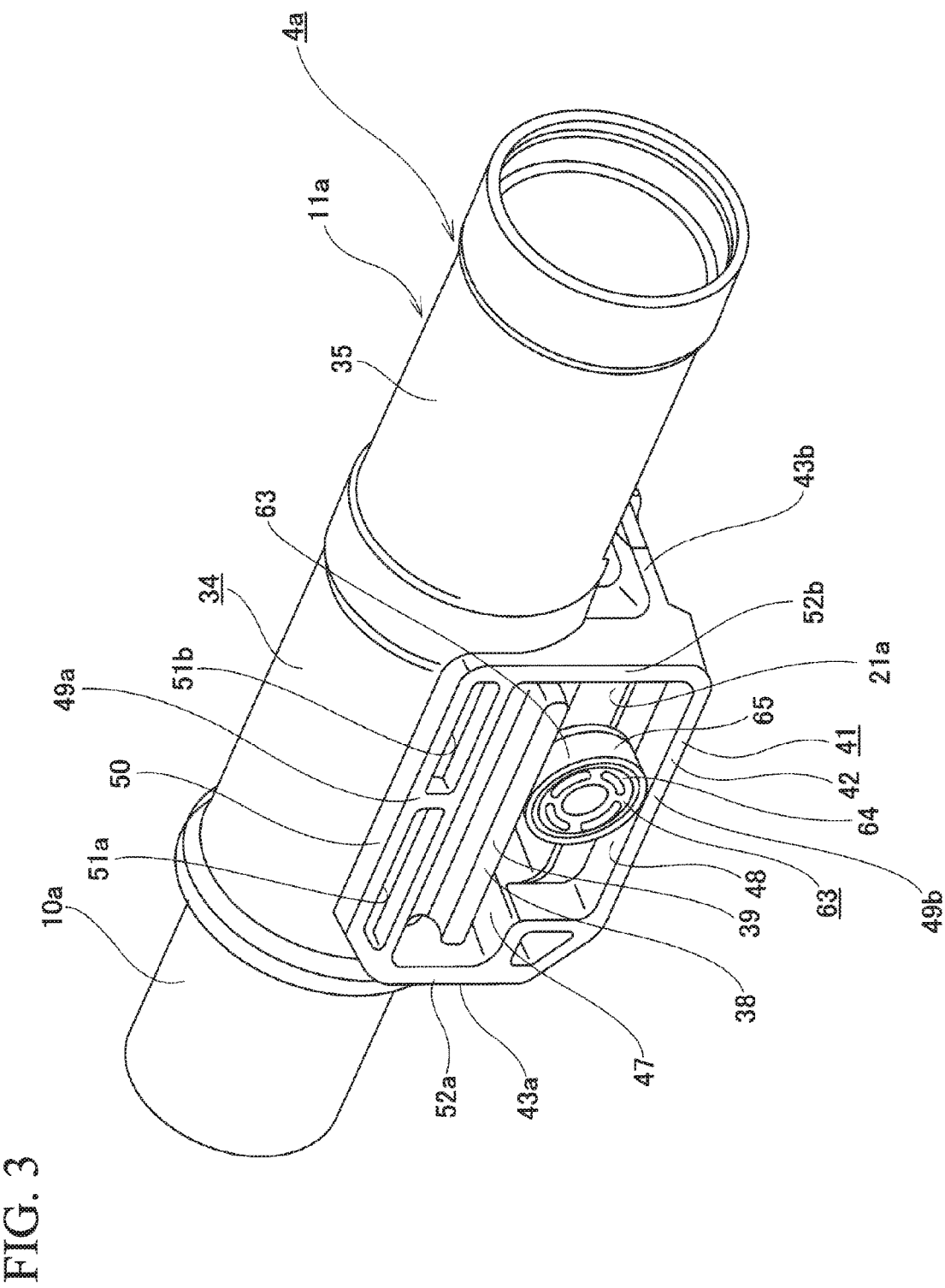
FIG. 3 is a perspective view of a steering column.
Figure 4:
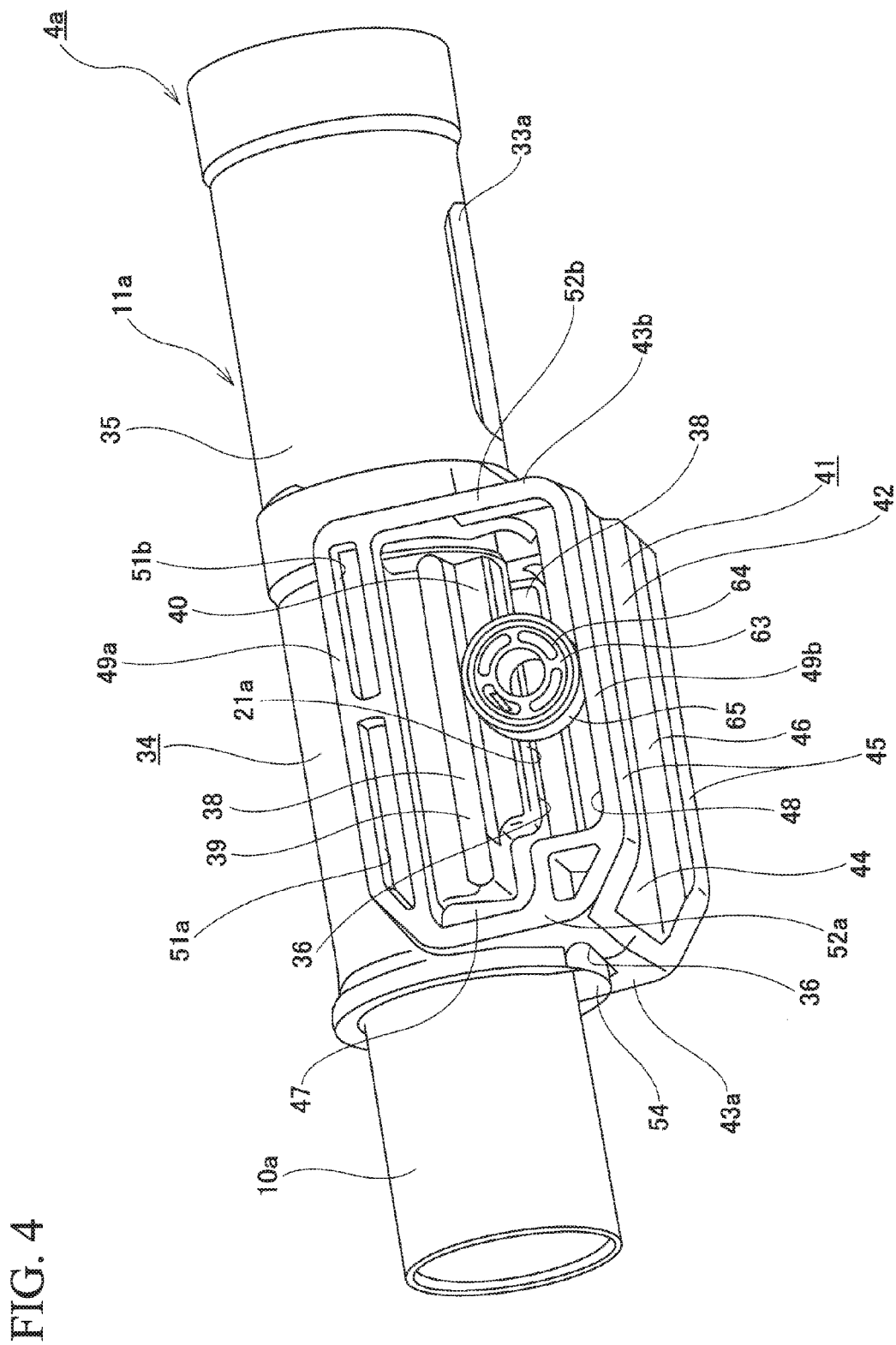
FIG. 4 is a perspective view of the steering column viewed from another angle.
Figure 5:
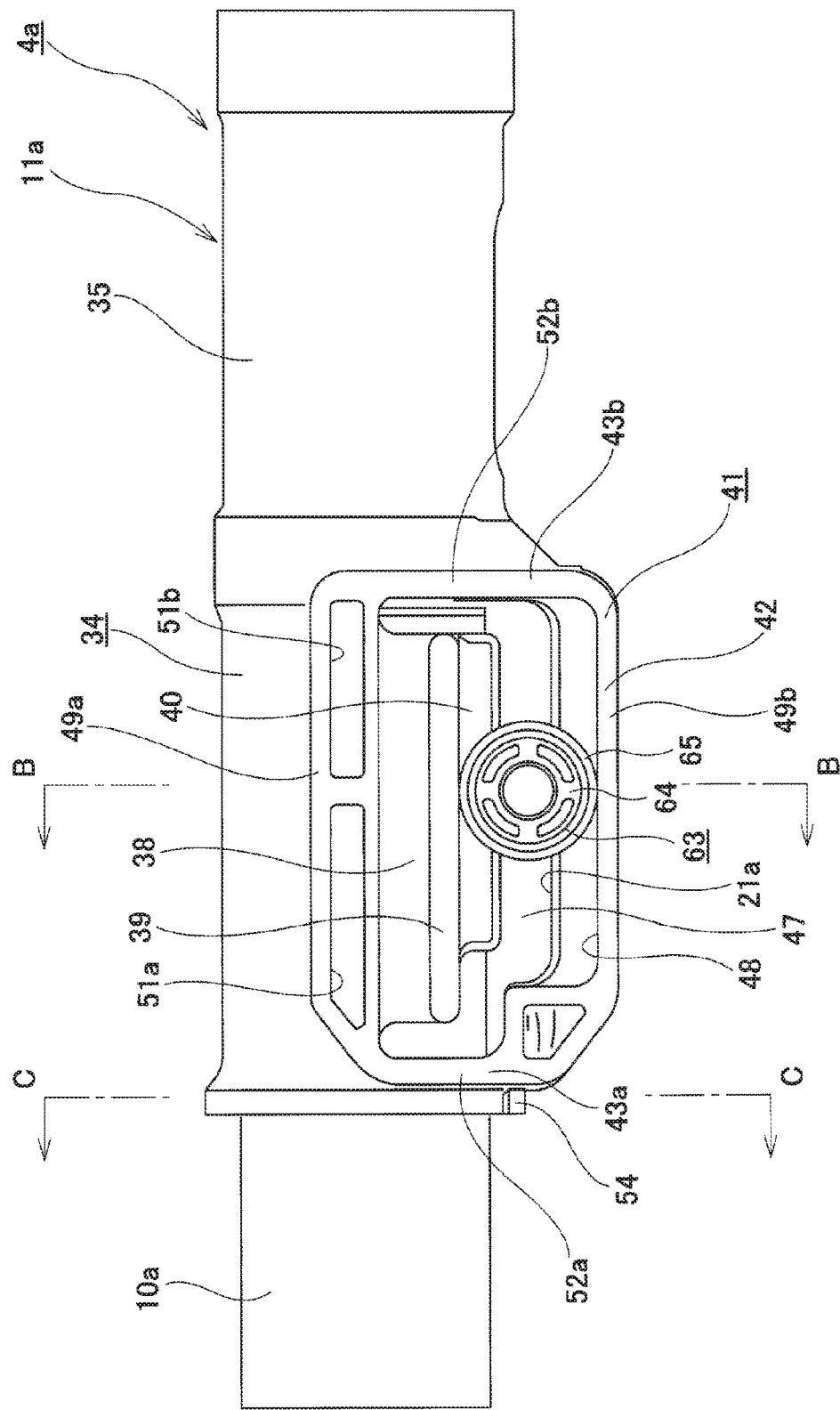
FIG. 5 is a side view of the steering column.
Figure 6:
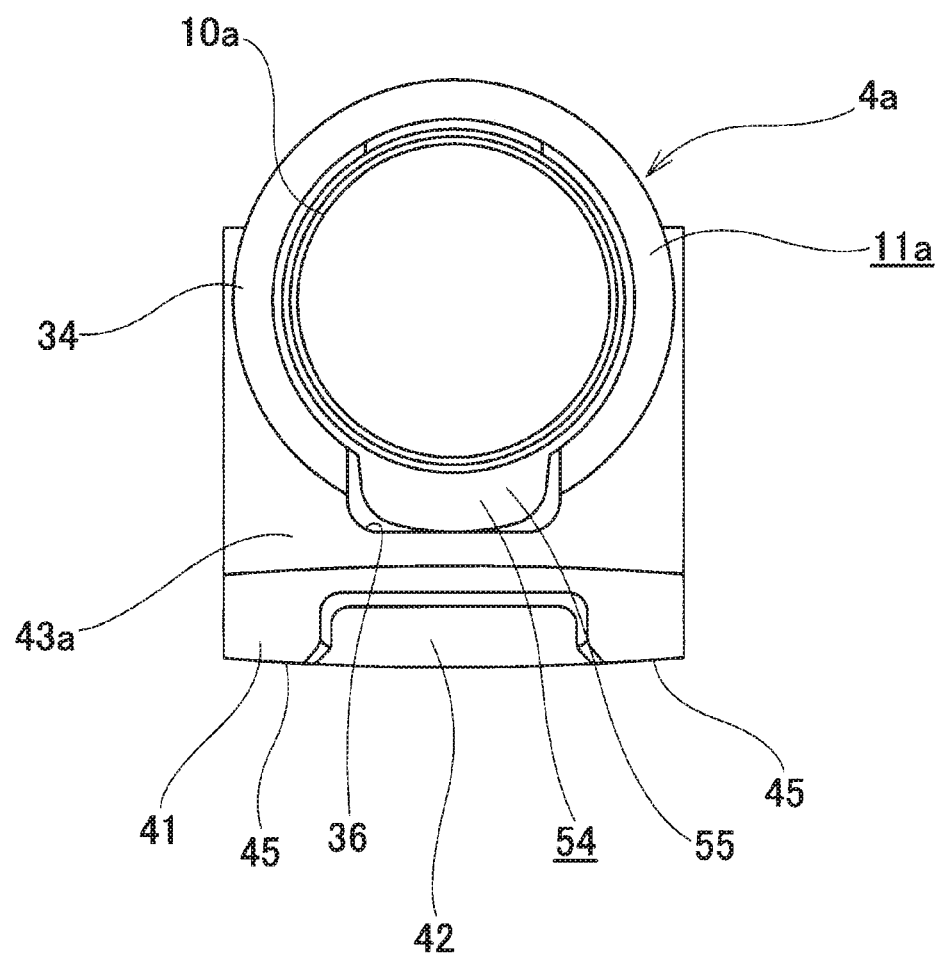
FIG. 6 is an end view of the steering column viewed from the left side of FIG. 5.
Figure 7:
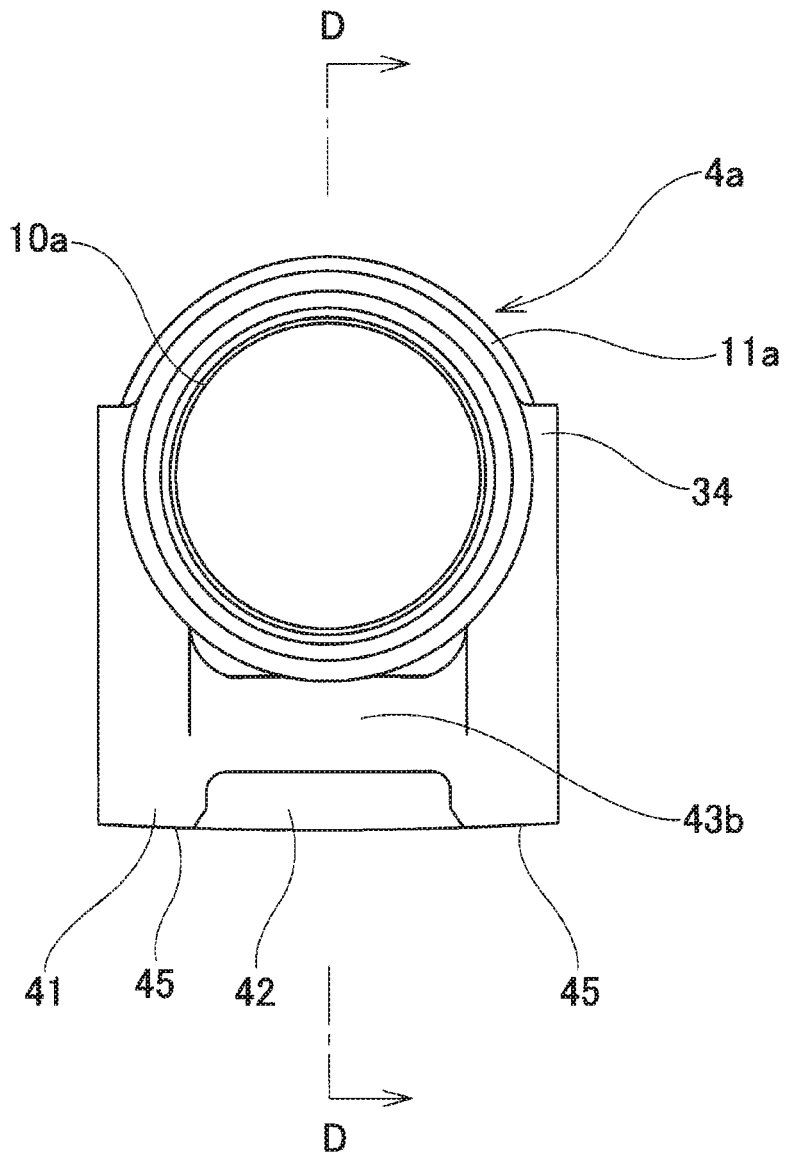
FIG. 7 is an end view of the steering column viewed from the right side of FIG. 5.
Figure 8:
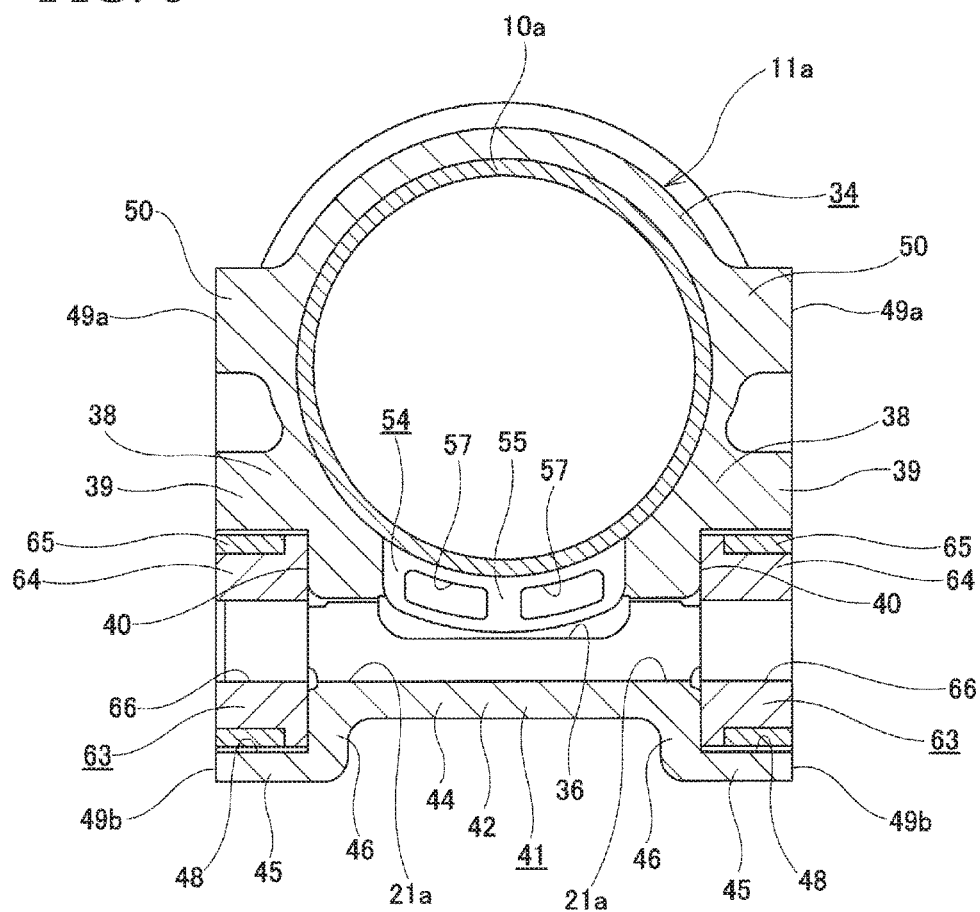
FIG. 8 is an enlarged cross-sectional view taken along line B-B of FIG. 5.
Figure 9:
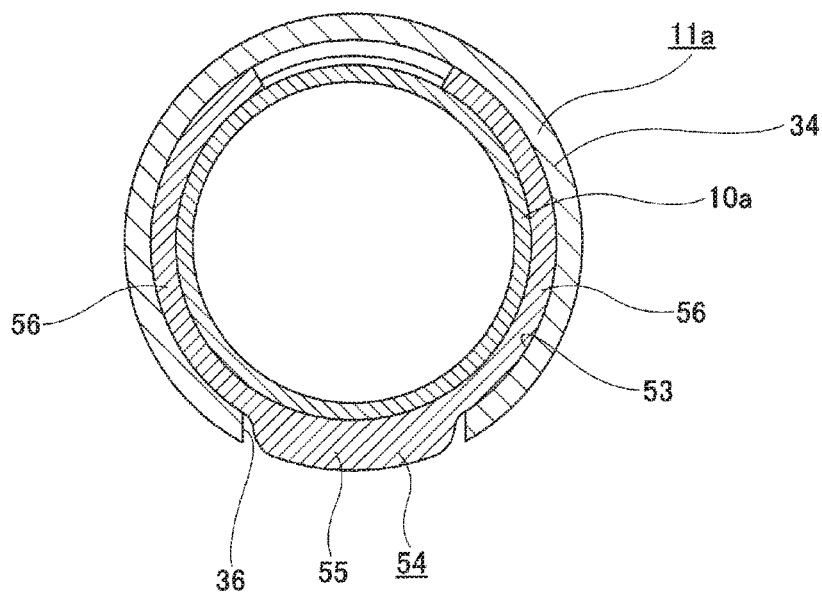
FIG. 9 is an enlarged cross-sectional view taken along line C-C of FIG. 5.

As shown in FIGS. 2, 3, and the like, in the steering device in this example, the acting surface 40 of the clamp part 38 and the acting surfaces 49a and 49b are separately provided on both of the sides of the outer column 11a in the width direction. The clamp parts 38 and 38 are used for elastically sandwiching the outer circumferential surface of the inner column 10a. On the other hand, for example, when the steering wheel 1 has been operated by a large force while the steering lock device and the like is being operated, the torque acting on the outer column 11a is transmitted to the inner surfaces of the support plates 22a and 22a of the upper bracket 17a via the acting surfaces 49a and 49b. The clamp parts 38 and 38 may be adopted as long as the clamp parts 38 and 38 can exhibit only a function of sandwiching the inner column 10a. For this reason, it is not necessary to set an excessively high strength to the clamp parts 38 and 38. Therefore, in the steering device in this example, desired bending characteristics such as greatly bending the clamp parts 38 and 38 in the width direction can be set for the clamp parts 38 and 38. On the other hand, the acting surfaces 49a and 49b may be adopted as long as the acting surfaces 49a and 49b can exhibit only a function of transmitting the torque. For this reason, it is not necessary to greatly bend sections in which the acting surfaces 49a and 49b in the outer column 11a are installed in the width direction. Therefore, according to the steering device in this example, securing the strength of the outer column 11a can be independently compatible with securing the holding force of the inner column 10a.

Moreover, in the steering device in this example, the inner surfaces of the support plates 22a and 22a are brought into contact with (pressed by) the acting surfaces 49a and 49b to hold the steering wheel 1 at the desired position. At this time, the clamp parts 38 and 38 are bent through the inner surfaces of the support plates 22a and 22a. In the outer column 11a, the acting surfaces 49a and 49b are substantially independent from the acting surface 40 of the clamp part 38, and the portions in which the acting surfaces 49a and 49b are installed have sufficiently high rigidity (bending rigidity and bent characteristics) compared to the clamp part 38. Furthermore, the acting surface 49a and the acting surface 49b are arranged to be spaced apart from each other in the first direction which intersects the second direction (the tightening direction). Particularly, a position of the acting surface 49b is outside of the range of the external form of the inner column 10a in the first direction and is outside of a range of an external form of the cylindrical body 35 of the outer column 11a. For this reason, the torque acting on the outer column 11a is absorbed through the acting surfaces 49a and 49b, and thus the torque can be prevented from being transmitted to the clamp part 38.

Second Example of Embodiment

Figure 26:
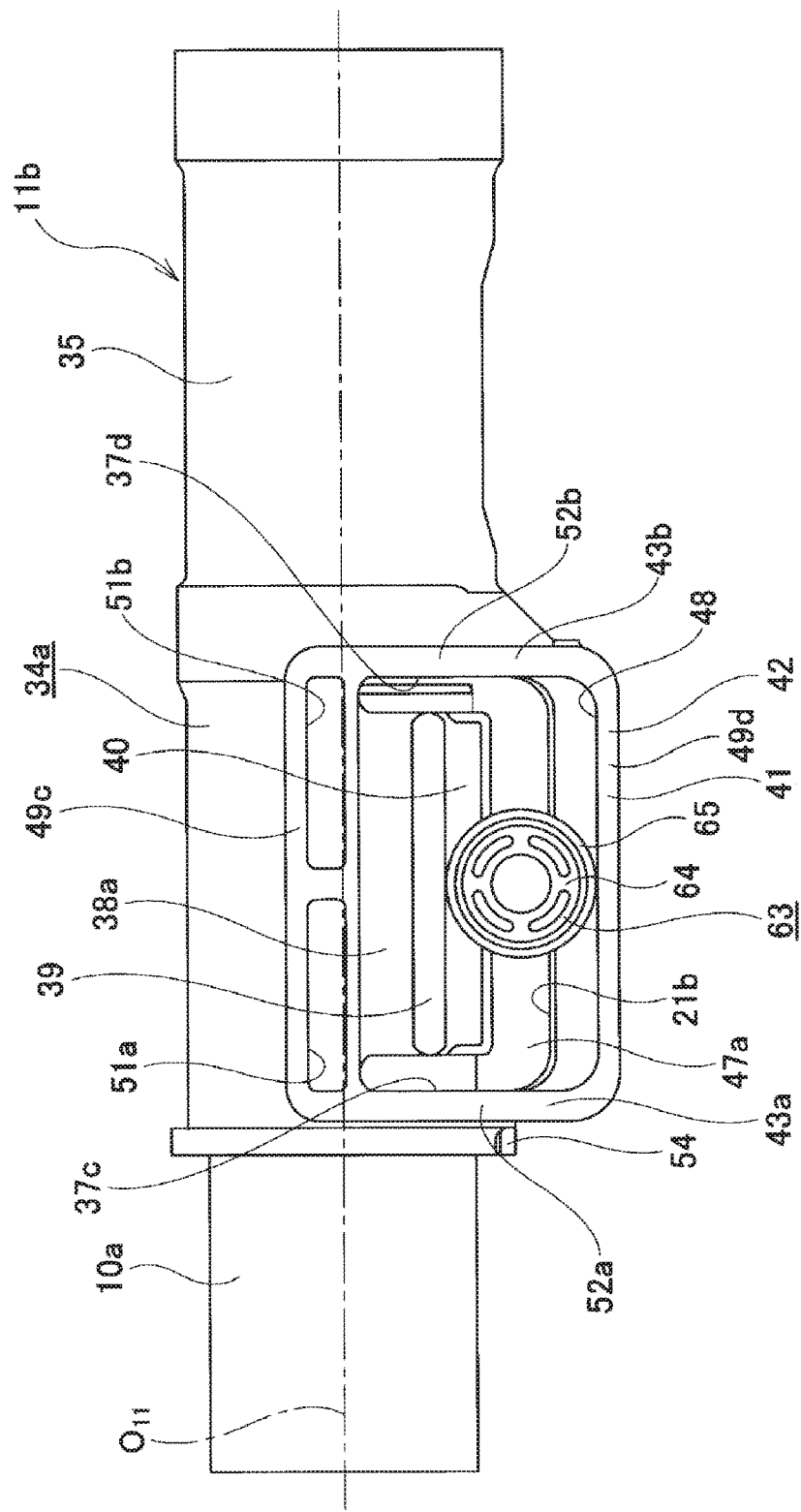
FIG. 26 is a side view of a steering column illustrating a second example according to an embodiment of the present invention.
Figure 27:
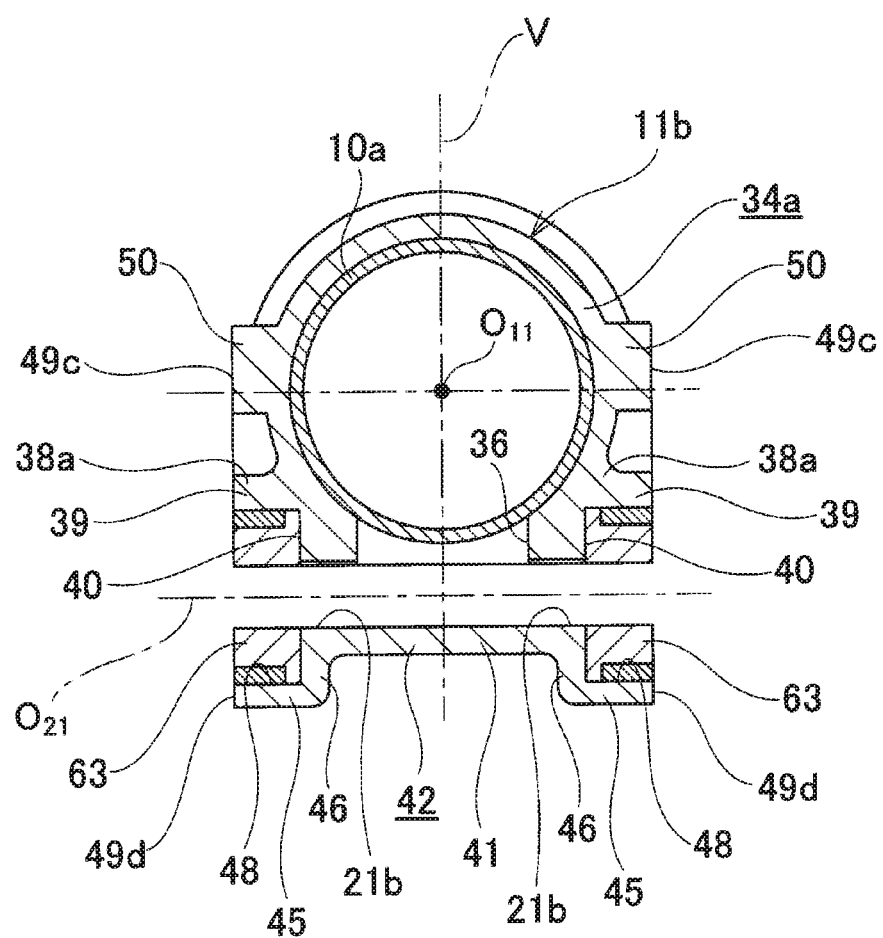
FIG. 27 is an enlarged cross-sectional view of the steering column.

A second example according to an embodiment of the present invention will be described with reference to FIG. 26 and FIG. 27. Particularly, shapes of clamp parts 38a and 38a configured to elastically enclose an outer circumferential surface of an inner column 10a in a steering device in this example are different from those of the above-described first example according to an embodiment. In the following description, constituent parts which are the same as or equivalent to those of the above-described will be denoted with the same reference numerals, and a description thereof will be simplified or omitted.

In the steering device in this example, cross-sectional shapes of the clamp parts 38a and 38a associated with a virtual plane orthogonal to a central axis $O_{11}$ of an outer column 11b have symmetrical shapes with respect to a virtual line V passing through the central axis $O_{11}$ of the outer column 11b and orthogonal to a central axis $O_{21}$ of slot portions (slits) 21b and 21b between the clamp parts 38a and 38a. Moreover, a cross-sectional shape of each of the clamp parts 38a and 38a is constant (has a symmetrical shape in a forward and rearward direction) over an entire length in an axial direction. The clamp part 38a has a substantially symmetrical shape and symmetric structure with respect to a symmetry axis along a first direction that intersects the axial direction. In this example, an acting surface 40 of the clamp part 38a has a substantially symmetrical shape with respect to the symmetry axis. In other words, a center of the acting surface 40 in the axial direction is located on the symmetry axis. In addition, in this example, centers of an acting surface 49c and an acting surface 49d of an outer column 11a in the axial direction coincide with a center of the clamp part 38a. For example, the centers of the acting surface 49c and the acting surface 49d in the axial direction coincide with the center of the acting surface 40 of the clamp part 38a. Furthermore, a center of a telescopic adjustment slot 21a in the axial direction coincides with the centers of the acting surface 49c, the acting surface 49d, and the acting surface 40.

In the steering device in this example, circumferential slits 37c and 37d extending linearly in a circumferential direction are formed in a frame body 34a of the outer column 11b. The circumferential slits 37c and 37d are provided to intersect portions near front and rear ends of an axial slit 36 formed in a lower surface of the frame body 34a in the circumferential direction. The clamp part 38a enclosed in three directions by the axial slit 36, the circumferential slit 37c, and the circumferential slit 37d is formed on portions near both sides of the frame body 34a in a width direction. In the steering device in this example, a gap 47a (a slit) is formed between the clamp part 38a and a reinforcing bridge part 41. A shape of the gap 47a viewed from the width direction has a substantially U shape (a substantially angulated U shape) in which front and rear end sections thereof are bent at right angles. Torque acting on the outer column 11b is transmitted to inner surfaces of support plates 22a and 22a of the upper bracket 17a (refer to FIG. 2 and the like) via the acting surfaces 49c and 49d. The acting surfaces 49c and 49d have a symmetrical shape in the forward and rearward direction. The acting surfaces 49c and 49d and flat continuous surfaces 52a and 52b are continuous in rectangular (quadrangular) frame shapes.

In the steering device in this example with the above-described constitution, the clamp parts 38a and 38a are bent using the inner surfaces of the support plates 22a and 22a such that the steering wheel 1 (refer to FIG. 46) is held at a desired position. At this time, concentration of stress on a part of the clamp parts 38a and 38a is prevented regardless of a front and rear position of the adjusting rod 24a (refer to FIG. 2) in telescopic adjustment slot portions 21b and 21b. For this reason, damage to the clamp parts 38a and 38a can be prevented regardless of a load acting on the clamp parts 38a and 38a (lower surfaces of projecting plates 39 and a pressed surface 40) in various directions {the vertical direction, the width direction (a horizontal direction of FIG. 27), and a direction of rotation (about the central axis $O_{11}$)} from rollers 63 and 63 disposed in the telescopic adjustment slot portions 21b and 21b. The clamp parts 38a and 38a are set such that amounts of bending thereof are the same so that a holding force of the inner column 10a is stabilized. In the steering device in this example, the telescopic adjustment slot portions 21b and 21b can be designed such that a dimension thereof in the forward and rearward direction is larger than that of the case of the above-described first example. In this case, an adjustment length in the forward and rearward direction of the steering wheel 1 increases. Other constitutions and operational effects are the same as those of the case of the first example.

Note that constituent elements in the above-described embodiments can be appropriately combined. Furthermore, some of the constituent elements may not be used in some cases. This disclosure relates to all novel and non-obvious features and aspects of variously disclosed embodiments themselves and various combinations and sub-combinations with other embodiments. The disclosed details and methods are not limited to any particular aspect, technique, or combination, and the disclosed details and methods are not required to have one or more particular advantages or solve a particular problem.

The outer column is not limited to a structure obtained by joining a frame body made of a light alloy and a cylindrical body made of an iron-based alloy, and the whole outer column may be constituted of a member made of a light alloy such as an aluminum-based alloy and a magnesium-based alloy. The steering device may have a structure including both mechanisms of a tilt adjustment mechanism and a telescopic adjustment mechanism, and may have a structure including only one of the telescopic adjustment mechanism and the tilt mechanism. A formation position of the axial slit and a formation position of the reinforcing bridge part may be opposite to (formed above) those of the above-described aspects in the vertical direction. When the interval of the inner surfaces of the pair of support plates is reduced, the end surfaces of the projecting plate in the width direction may be configured to be pressed without the roller (a rotating member) being pressed. In this case, for example, the support plate can be pressed to be bent inward in the width direction between the upper and lower acting surfaces. The steering device may not include the steering lock device. In this case, as the torque acting on the outer column, for example, a reaction force during steering, particularly, a steering reaction force increases when a power assist mechanism is attached.

In one embodiment, the steering device includes the steering column, the support bracket, and the adjusting rod. The steering column is configured by loosely fitting (externally engaging) the front end section of the outer column disposed on the rear side of the steering column to the rear end section of the inner column disposed on the front side of the steering column such that relative displacement in the axial direction is possible. Moreover, the support bracket is supported by and fixed to the vehicle body, and includes the pair of support plates sandwiching the front end section of the outer column from both sides of the outer column in the width direction. Moreover, the adjusting rod is disposed in a state in which the adjusting rod is inserted through a first through hole (for example, the telescopic adjustment slot or a circular hole) formed in the front end section of the outer column and second through holes (for example, the tilt adjustment through holes or circular holes) formed in the support plates in the width direction. Note that, when the steering device is implemented using a structure including the telescopic mechanism, the first through hole is set to be a telescopic adjustment slot which is elongated in the axial direction, and when the steering device is implemented using a structure including the tilt mechanism, the second through holes are set to be tilt adjustment slots which are elongated in the vertical direction. On the other hand, when only any one of the telescopic mechanism and the tilt mechanism is included and the other mechanism is not included, only one of the through holes is set to be a slotted hole/elongated hole and the other through hole is set to be a circular hole.

In one example, at least one or more slits extending in the axial direction of the outer column are formed in the front end section of the outer column. Note that a shape of the slit can be formed in a straight linear shape extending in the axial direction, and can be formed in a substantially U shape (an angulated U shape) extending in the same direction in the circumferential direction (the vertical direction) from both end sections of the slit in the axial direction (the forward and rearward direction). Moreover, the pair of clamp parts in the outer column, which are adjacent to the slit in the circumferential direction, bent when the interval between the inner surfaces of the support plates is reduced, and elastically sandwich the outer circumferential surface of the inner column are provided on both sides of the outer column in the width direction. In addition, the first surface and the second surface configured to transmit torque acting on the outer column (for example, torque input to the steering wheel and transmitted via the steering shaft, the key lock collar, and the lock unit) to the inner surfaces of the support plates are formed on portions of both sides of the outer column in the width direction which are higher in rigidity in the width direction than portions which sandwich the clamp part, are spaced apart from each other in the vertical direction, and in which the clamp part is provided.

In one example, one of the torque transmission surfaces which is provided on a side which is further away from the central axis of the outer column than the clamp part in the vertical direction among the pair of torque transmission surfaces formed in the both of the lateral surfaces of the outer column in the width direction is formed by a lateral surface in the width direction of the reinforcing plate integrally formed with, or fixed as a separate body from, the outer column extending in the width direction in a state in which the reinforcing plate covers the clamp part in the vertical direction. In one example, the first through holes (for example, the telescopic adjustment slot extending in the axial direction) is formed between the distal end section of the clamp part and the reinforcing plate that are opposite to each other in the vertical direction.

In one example, the pair of joining parts extending in the vertical direction are provided on the front and rear end sections of the reinforcing plate. Moreover, the reinforcing bridge part is constituted of the joining part and the reinforcing plate. In addition, the substantially U-shaped gap is provided between the reinforcing bridge part and the clamp part.

In one example, the torque transmission surface is formed in a linear flat surface of the outer column extending in the axial direction. In addition, both end sections of the pair of torque transmission surfaces in the forward and rearward direction formed on lateral surfaces of the outer column in the width direction are mutually continuous with the pair of flat continuous surfaces extending in the vertical direction. Moreover, the torque transmission surface and the flat continuous surface are made continuous in a rectangular frame shape.

In one example, each of the clamp parts can be constituted to have a shape extending in the axial direction of the outer column.

In one example, a cross-sectional shape of the clamp part associated with a virtual plane orthogonal to the central axis of the outer column can be set to be symmetrical (have a shape) and can be constant (not be changed) over the entire axial length with respect to an imaginary line passing through the central axis of the column between the clamp parts and orthogonal to the central axis of the first through hole.

In one example, the locking through hole, through which the lock pin constituting the anti-theft lock unit is inserted, is formed in the outer column.

According to the above-described embodiments, securing the strength of the outer column can be compatible with securing the holding force of the inner column. That is to say, in the case of the present invention, the clamp parts configured to elastically sandwich the outer circumferential surface of the inner column and the pair of torque transmission surfaces configured to transmit the torque acting on the outer column to the inner surfaces of the support plates of the support bracket are separately and independently provided on both sides of the outer column in the width direction. For this reason, the clamp parts may be adopted as long as the clamp parts can exhibit only a function of sandwiching the inner column and can be greatly bent in the width direction because the clamp parts do not need to secure the strength like in the case of the conventional structure. Moreover, the torque transmission surfaces may be adopted as long as the torque transmission surfaces can exhibit only a function of transmitting torque, and the torque transmission surfaces do not need to be greatly bent in the width direction. As a result, according to the present invention, securing the strength of the outer column can be compatible with securing the holding force of the inner column.

EXPLANATION OF NUMERALS AND CHARACTERS

1 Steering wheel
2, 2a Steering shaft
3 Steering wheel
4, 4a Steering column
5 Steering force auxiliary device
6 Tie rod
7 Steering gear unit
8 Inner shaft
9, 9a Outer shaft
10, 10a Inner column
11, 11a, 11b Outer column
12, 12a Gear housing
13 Output shaft
14, 14a Lower bracket
15, 15a Vehicle body
16, 16a Tilt shaft
17, 17a Upper bracket (support bracket)
18, 18a Locking capsule
19 Slit
20 Clamp part
21, 21a, 21b Slot (telescopic adjustment slot, slit)
22, 22a Support plate
23, 23a Slot (tilt adjustment slot)
24, 24a Adjusting rod
25 Adjusting nut
26, 26a Adjusting lever
27, 27a Anchor part
28 Universal joint
29 Intermediate shaft
30 Universal joint
31 Shaft (input shaft)
32, 32a Electric motor
33, 33a Locking through hole
34, 34a Frame body (main body, sandwiched portion main body)
35 Cylindrical body (cylindrical member)
36 Axial slit (first slit portion)
37a, 37b, 37c, 37d Circumferential slit (second slit portion)
38, 38a Clamp part
39 Projecting part (projecting plate)
40 Acting surface (third surface, pressed surface)
41 Reinforcing bridge part (reinforcing part)
42 Reinforcing plate
43a, 43b Joining part
44 Flat plate
45 Outer flat plate (lower extension part)
46 Step part (cutout)
47 Gap
48 Roller travel groove
49a, 49c Acting surface (first surface, torque transmission surface)
49b, 49d Acting surface (second surface, torque transmission surface)
50 Ridge part
51a, 51b Depressed portion
52a, 52b Flat continuous surface
53 Locking groove (depressed portion)
54 Slide member
55 Slide part main body
56 Support arm
57 Depressed portion
58 Attachment plate
59 Locking cutout
60 Locking groove
61 Through hole
62 Shaft part
63 Roller
64 Roller main body
65 Collar
66 Through hole
67 Flange
68 Thin part
69 Cam device
70 Nut
71A Bent part
72A Tilt spring
73 Lock unit
74 Key lock collar
75 Lock pin
76 Key lock depressed portion
80 Tightening mechanism

The invention claimed is:

1. A steering device comprising:
a steering column having a configuration in which a front section of an outer column is set with respect to a rear section of an inner column so that a relative displacement therebetween can be applied in an axial direction, the inner column being arranged at a front side of the steering column, the outer column being arranged at a rear side of the steering column;
a support bracket including a pair of support plates which sandwich the front section of the outer column from both sides thereof in a width direction, the support bracket being installable on a vehicle body; and
an adjusting rod inserted through a first through hole formed in the front section of the outer column and second through holes formed in the support plates in the width direction,
wherein a slit is formed in the front section of the outer column and extends at least in the axial direction of the outer column,
a pair of clamp parts are provided adjacent to the slit and are arranged on portions on both of the sides of the outer column in the width direction such that the clamp parts are bent when an interval between inner surfaces of the pair of support plates is reduced to elastically sandwich an outer circumferential surface of the inner column, a pair of first surfaces are respectively provided on both sides of the outer column in the width direction, a pair of second surfaces are respectively provided on both sides of the outer column in the width direction such that torque acting on the outer column via the first surfaces and the second surfaces is transmitted to inner surfaces of the support plates, the clamp parts are arranged between the first surfaces and the second surfaces, the first surfaces are arranged closer to a central axis of the inner column than the second surfaces, the first surfaces are bridged by a part of the outer columns continuously extending between the first surfaces in the width direction, and the second surfaces are bridged by a reinforcing plate continuously extending between the second surfaces in the width direction such that the reinforcing plate covers the pair of clamp parts.

2. The steering device according to claim 1, wherein the first through hole is provided between a distal end section of the clamp parts and the reinforcing plate.

3. The steering device according to claim 1, wherein a pair of joining parts extending in a vertical direction are provided on both end sections of the reinforcing plate in a forward and rearward direction, a bridge part is constituted of the pair of joining parts and the reinforcing plate, and a substantially U-shaped gap is provided between the bridge part and the clamp parts.

4. The steering device according to claim 1, wherein the first surfaces and the second surfaces have a straight linear shape which extends in the axial direction of the outer column.

5. The steering device according to claim 4, wherein a continuous surface with a rectangular frame shape is formed by the first surfaces, the second surfaces, and a pair of flat continuous surfaces extending in the vertical direction.

6. The steering device according to claim 1, wherein the clamp parts are formed in a state in which the clamp parts extend in the axial direction of the outer column.

7. The steering device according to claim 1, wherein cross-sectional shapes of the clamp parts associated with a virtual plane orthogonal to a central axis of the outer column pass through the central axis of the outer column between the clamp parts, are symmetrical to an imaginary line orthogonal to a central axis of the first through hole, and are constant over an entire length of the clamp parts in the axial direction.

8. The steering device according to claim 1, wherein a locking through hole, through which a lock pin constituting an anti-theft lock unit is inserted, is formed in the outer column.

9. A steering device comprising:
a steering column including an outer column and an inner column, a part of the inner column being enclosed by the outer column;
a support bracket attachable to a vehicle body to support the steering column; and
a tightening mechanism having a first state in which the steering column is tightened with the support bracket and a second state in which the tightening is released,
wherein the outer column includes:
a pair of first surfaces and a pair of second surfaces arranged so as to be spaced apart from each other in a first direction, which intersects an axial direction, and such that the first surfaces and the second surfaces are pressed by the support bracket in the first state, the pair of first surfaces being arranged closer to a central axis of the inner column in the first direction than the part of second surfaces; and
a pair of clamp parts arranged between the pair of first surfaces and the pair of second surfaces in the first direction, provided separately from the first surfaces and the second surfaces, and such that the clamp parts are pressed by the support bracket in the first state, wherein
a part of the outer column is provided to extend and bridge between the first surfaces on both sides of the outer column in a second direction, which intersects the axial direction and the first direction, and
a reinforcing part is provided to extend and bridge between the second surfaces on both sides of the outer column in the second direction.

10. The steering device according to claim 9,
wherein the tightening mechanism has an adjusting rod, and
the adjusting rod is arranged between the pair of first surfaces and the pair of second surfaces in the first direction.

11. The steering device according to claim 9,
wherein the outer column further includes a slit provided between the first surface and the second surface in the first direction, and
the clamp part is provided adjacent to the slit.

* * * * *